United States Patent
Dakshinamurthy et al.

(10) Patent No.: US 8,428,529 B2
(45) Date of Patent: Apr. 23, 2013

(54) METHOD AND SYSTEM FOR UPLINK BEAMFORMING CALIBRATION IN A MULTI-ANTENNA WIRELESS COMMUNICATION SYSTEM

(75) Inventors: Sriraman Dakshinamurthy, San Jose, CA (US); Robert Gustav Lorenz, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 68 days.

(21) Appl. No.: 13/023,539

(22) Filed: Feb. 8, 2011

(65) Prior Publication Data

US 2011/0195670 A1 Aug. 11, 2011

Related U.S. Application Data

(60) Provisional application No. 61/302,214, filed on Feb. 8, 2010.

(51) Int. Cl.
*H04B 17/02* (2006.01)
*H04B 7/00* (2006.01)

(52) U.S. Cl.
USPC ........................................ 455/139; 455/276.1

(58) Field of Classification Search .................... 455/69, 455/73, 130, 139, 276.1, 101, 132–140
See application file for complete search history.

(56) References Cited

U.S. PATENT DOCUMENTS

| | | | |
|---|---|---|---|
| 4,612,548 | A | 9/1986 | Beltran |
| 5,412,414 | A | 5/1995 | Ast et al. |
| 5,530,449 | A | 6/1996 | Wachs et al. |
| 5,581,548 | A | 12/1996 | Ugland et al. |
| 6,320,540 | B1 | 11/2001 | Meredith |
| 7,154,442 | B2 * | 12/2006 | van Wonterghem et al. . 343/702 |

(Continued)

FOREIGN PATENT DOCUMENTS

| | | |
|---|---|---|
| WO | WO 2009/078529 A1 | 6/2009 |
| WO | WO 2011/088452 A1 | 7/2011 |
| WO | WO 2011/097651 A1 | 8/2011 |
| WO | WO 2011/097652 A1 | 8/2011 |

OTHER PUBLICATIONS

International Search Report for International Application No. PCT/US2011/024112, United States Patent and Trademark Office, United States, mailed on Apr. 1, 2011.

(Continued)

*Primary Examiner* — Sonny Trinh
(74) *Attorney, Agent, or Firm* — Sterne, Kessler, Goldstein & Fox, P.L.L.C.

(57) ABSTRACT

A wireless transceiver, comprising a transmitter, a receiver and a plurality of antennas, determines transmit phase relationship between at least two of antennas based on radio frequency (RF) signals received via the at least two antennas from one or more antennas of a base station. RF signals are transmitted via the at least two antennas utilizing the determined transmit phase relationship. The receiver is calibrated based on receiver performance determined from the received RF signals for subsequent reception of RF signals. The transmit phase relationship is dynamically adjusted based on the transmit RF measurements and the determined receiver performance. Transmit channel qualities are determined for each transmit antenna based on the transmit RF measurements and the dynamically adjusted transmit phase relationship. Transmit antennas are dynamically selected based on the adjusted transmit phase relationship, the characterized transmit channel qualities and the determined receiver performance for subsequent transmission to the base station.

20 Claims, 10 Drawing Sheets

U.S. PATENT DOCUMENTS

| | | | |
|---|---|---|---|
| 7,245,257 | B1 | 7/2007 | Bruce et al. |
| 7,248,216 | B2 | 7/2007 | Akiyama et al. |
| 7,280,515 | B2 * | 10/2007 | Ranta .......................... 370/337 |
| 7,286,855 | B2 | 10/2007 | Raleigh et al. |
| 7,308,705 | B2 | 12/2007 | Gordy et al. |
| 7,324,794 | B2 * | 1/2008 | Chari et al. .................. 455/130 |
| 7,450,065 | B1 | 11/2008 | Bruce et al. |
| 7,616,704 | B2 | 11/2009 | Li et al. |
| 8,055,216 | B2 | 11/2011 | Dent |
| 2003/0179138 | A1 | 9/2003 | Chen |
| 2004/0017326 | A1 | 1/2004 | Merrill |
| 2004/0228422 | A1 | 11/2004 | Silveira et al. |
| 2007/0173277 | A1 | 7/2007 | Yun |
| 2007/0222677 | A1 | 9/2007 | Strong |
| 2008/0153433 | A1 | 6/2008 | Pallonen et al. |
| 2009/0005120 | A1 | 1/2009 | Ylitalo |
| 2010/0214017 | A1 | 8/2010 | Couchman et al. |
| 2011/0176635 | A1 | 7/2011 | Hochwald et al. |
| 2011/0201283 | A1 | 8/2011 | Lorenz et al. |

OTHER PUBLICATIONS

International Search Report directed toward International Application No. PCT/US2011/024111, United States Patent and Trademark Office, United States, mailed on May 6, 2011.

Written Opinion directed toward International Application No. PCT/US2011/024111, United States Patent and Trademark Office, United States, mailed on May 6, 2011.

International Preliminary Report directed toward International Application No. PCT/US2011/024111, The International Bureau of WIPO, United States, issued on Aug. 14, 2012.

International Search Report directed toward International Application No. PCT/US2011/021536, United States Patent and Trademark Office, United States, mailed on Apr. 4, 2011.

Written Opinion directed toward International Application No. PCT/US2011/021536, United States Patent and Trademark Office, United States, mailed on Apr. 4, 2011.

International Preliminary Report on Patentability directed toward International Application No. PCT/US2011/021536, The International Bureau of WIPO, Geneva, Switzerland, United States, mailed on Jul. 24, 2012.

Written Opinion directed toward International Application No. PCT/US2011/024112, United States Patent and Trademark Office, United States, mailed on Apr. 1, 2011.

International Preliminary Report on Patentability directed toward International Application No. PCT/US2011/024112, The International Bureau of WIPO, United States, issued on Aug. 14, 2012.

* cited by examiner

METHOD AND SYSTEM FOR UPLINK BEAMFORMING CALIBRATION IN A MULTI-ANTENNA WIRELESS COMMUNICATION SYSTEM

CROSS-REFERENCE TO RELATED APPLICATIONS/INCORPORATION BY REFERENCE

This patent application makes reference to, claims priority to and claims the benefit from U.S. Provisional Patent Application Ser. No. 61/302,214 filed on Feb. 8, 2010.

This patent application also makes reference to U.S. application Ser. No. 13/023,534 filed on Feb. 8, 2011.

Each of the above stated applications is hereby incorporated herein by reference in its entirety.

FIELD OF THE INVENTION

Certain embodiments of the invention relate to communication systems. More specifically, certain embodiments of the invention relate to a method and system for uplink beamforming calibration in multi-antenna communication system.

BACKGROUND OF THE INVENTION

Wireless communication systems may be implemented utilizing various access techniques such as, for example, code division multiple access (CDMA), time division multiple access (TDMA), frequency division multiple access (FDMA), and other multiple access techniques to communicate services such as multimedia services or applications to users over communication channels. A communication channel is characterized by fluctuating signal levels and additive interference from in-cell and outer-cells. Signals transmitted over communication channels may exhibit co-channel interference, path loss, shadowing, and/or multipath fading, which directly affect the communicated signals and result in time-varying signal quality such as time-varying signal to interference plus noise power ratio (SINR).

The use of multiple receive antennas at a wireless terminal has been adopted in various wireless communication systems, including the 3GPP long-term evolution (LTE) and Worldwide Interoperability for Microwave Access (WiMAX), in order to improve link quality, throughput, mitigate multipath fading. A plurality of antennas enables the subscriber (SS) to reject interference based upon the spatial signature of the interference. Multiple antennas may be used in both uplink and downlink transmission. In a time division duplex (TDD) system, the uplink and downlink channels are reciprocal; hence, a subscriber could exploit the channel knowledge and transmit from a plurality of antennas so as to have the transmissions coherently combine at the base station. This is referred to as beamforming.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for uplink beamforming calibration in a multi-antenna wireless communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for uplink beamforming calibration in a multi-antenna communication system. In various embodiments of the invention, a wireless transceiver, comprising a transmitter, a receiver, and an antenna array, may be operable to determine a desired time-varying transmit phase relationship between a plurality of antennas based on radio frequency signals received by the plurality of antennas, and a phase difference in the receiver path and a phase differences between the transmitter path to each of the plurality of antennas.

The received radio frequency signals are communicated from one or more antennas of a base station. Two or more of the plurality of antennas, and corresponding transmit power levels may be selected, based upon characteristics determined from the received RF signals. An exemplary characteristic is receive signal strength, commonly referred to as RSSI. The wireless transceiver may transmit RF signals to the base station utilizing the selected transmit antennas wherein the phase relationship between the transmitted signals is responsive to the measured receive phase differences. The received RF signals may comprise subcarriers overlapping with subcarriers allocated by the base station to the antenna array for transmission. The receiver performance of the wireless transceiver may be determined from the received RF signals on a frequency selective basis or on a non-frequency selective basis. The desired transmit phase may be computed on a frequency selective or a non-frequency selective basis.

During transmission, the transmit power and the transmit phase of the transmitting RF signals may be measured. The transmit phase relationship may be dynamically adjusted based on the transmit RF measurements, and the desired transmit phase. One or more transmit antennas in the antenna array may be dynamically selected based on the received RF signals, and/or the characterized transmit channel qualities. Previously computed channel characteristics and the desired transmit phase may be utilized to transmit subsequent RF signals.

Figure 1:
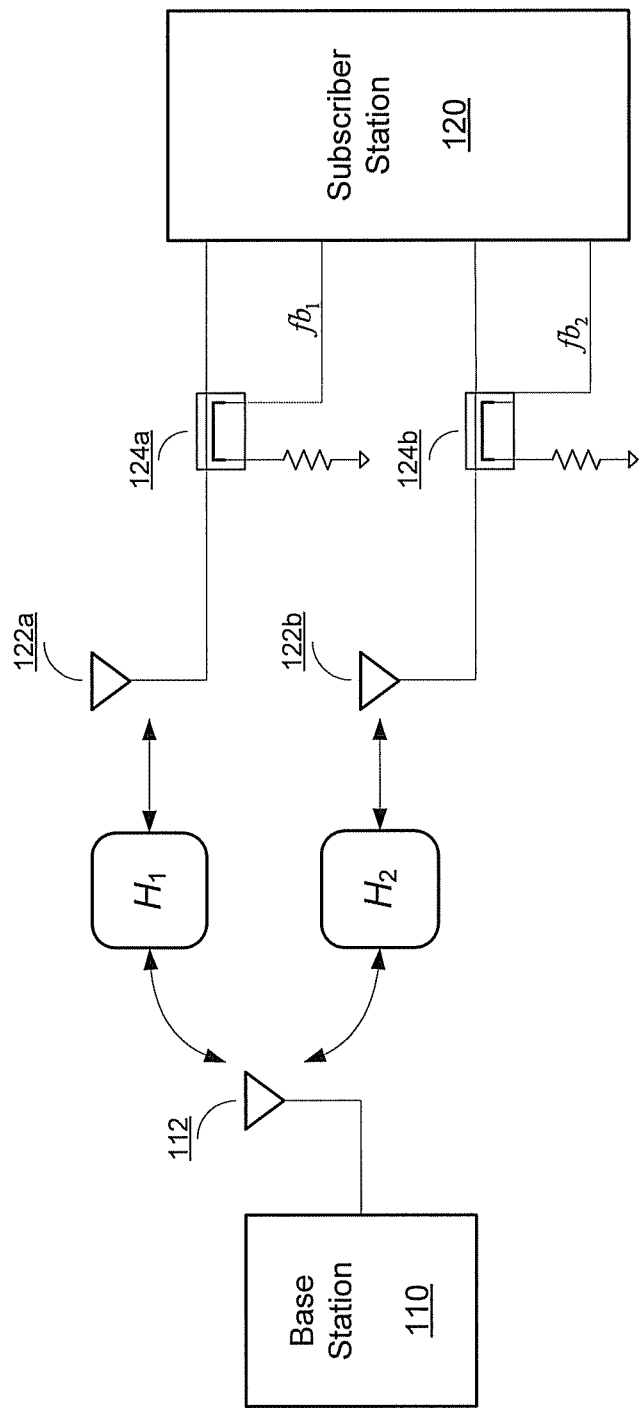
FIG. 1 is a diagram illustrating an exemplary communication system that is operable to support uplink beamforming calibration, in accordance with an embodiment of the invention.

FIG. 1 is a diagram illustrating an exemplary communication system that is operable to support uplink beamforming calibration, in accordance with an embodiment of the invention. Referring to FIG. 1, there is shown a communication system 100. The communication system 100 comprises a base station 110 and a subscriber station 120.

The base station 110 may comprise suitable logic, circuitry, interfaces and/or code that are operable to manage and schedule communication resources in an uplink direction and/or downlink direction to users of various subscriber stations such as the subscriber station 110. The base station 110 may be coupled to an antenna 112 that may be utilized to communicate information with subscriber stations such as the subscriber station 120 in an uplink and/or downlink direction. Although a single antenna 112 is illustrated for the base station 110, the invention may not be so limited. Accordingly, two or more antennas may be utilized by the base station 110 to support the uplink beamforming calibration without departing from the spirit and scope of various embodiments of the invention.

A subscriber station such as the subscriber station 120 may comprise suitable logic, circuitry, interfaces and/or code that are operable to communicate information with the base station 110. The subscriber station 120 may transmit and/or receive radio frequency (RF) signals over radio channels established between the subscriber station 120 and the base station 110. The strength of the received RF signals from the base station 110 may vary depending on channel conditions such as, for example, fluctuating signal strength levels and/or additive interference from neighboring base stations. Depending on device capabilities, the subscriber station 120 may communicate information with the base station 110 utilizing various access technologies such as, for example, CDMA, GSM, UMTS, LTE and/or WiMAX.

The subscriber station 120 may also be operable to communicate information with the base station via an antenna array 122 coupled to the subscriber station 120. The antenna array 122 may comprise a plurality of antenna 122a-122b each connected to a different RF processing path or RF chain within the subscriber station 120. The antenna array 122 may enable spatial-domain signal processing and thereby, mitigate interferences.

The subscriber station 120 may also be operable to calculate the phase relationship between the transmitter paths, coupled by the directional couplers 124a and 124b to the antennas 122a-122b, by cross-correlating down-converted samples of the transmit signals with the respective baseband signal applied to each transmitter chains or paths. The subscriber station 120 may be operable to control or adjust the transmit phase relationships between the antennas 122a-122b. The transmit phase relationships between the antennas 122a-122b may be selected or assigned on a frequency selective basis and on the basis of the receive phase differences. For example, an OFDM (Orthogonal Frequency Division Multiplexing) channel may comprise a plurality of subcarriers. In this regard, the transmit phase relationships between the antennas 122a-122b may be adjusted on a subcarrier-by-subcarrier basis or on the basis of groups of subcarriers.

A RF directional coupler such as the RF directional coupler 124a may comprise suitable logic, circuitry, interfaces and/or code that are operable to control power levels on signals communicated via the antenna 122a. In an embodiment of the invention, a single RF directional coupler may be coupled to each of the plurality of antennas 122a-122b, respectively. For example, the antenna 122a and the antenna 122b may be coupled with a RF directional coupler 124a and a RF directional coupler 124b, respectively. The RF directional couplers 124a and 124b may be operable to couple a small portion of the transmitter outputs to the corresponding feedback paths denoted $fb_1$ and $fb_2$. The RF directional coupler 124a may be a bidirectional device. In this regard, the single RF directional coupler 124a may be utilized for both the transmit path and the receive path to antenna 122a. The RF directional coupler 124a may be operable to allow one or more samples of a RF transmit signal, which is an input to the RF directional coupler 124a, to be extracted from the RF transmit signal. In this regard, the amplitude and/or the phase delays of the RF transmit signal through the transmit path to the antenna 122a may be measured or calculated utilizing the extracted samples In an exemplary embodiment of the invention, during the transmit interval, the subscriber station 120 may control or adjust the transmit phase relationships between the antennas 122a-122b such that for each frequency, the transmit phase difference between the antennas 122a-122b is the negative of the receive phase difference between the antennas 122a-122b, as measured at the antennas 122a-122b. Let $\phi_{Rx,1}(f,t_{Rx})$ and $\phi_{Rx,2}(f,t_{Rx})$ denote the receive phases of the antenna 122a and the antenna 122b, at frequency f and at time of reception, $t_{Rx}$. Let $\phi_{Tx,1}(f,t_{Tx})$ and $\phi_{Tx,2}(f,\phi_{Tx})$ denote the transmit phases of the antenna 122a and the antenna 122b, at frequency f and at time of transmission, $t_{Tx}$. The transmit phase relationship between the antenna 122a and the antenna 122b, during the transmit interval $t_{Tx}$, may be profitably chosen to satisfy the relationship of $$\phi_{Tx,2}(f,t_{Tx})-\phi_{Tx,1}(f,t_{Tx})=-(\phi_{Rx,2}(f,t_{Rx})-\phi_{Rx,1}(f,t_{Rx})) \quad (1)$$

To satisfy this relationship, three phase relationships may be considered, namely, the actual phase difference of the wireless channels, the phase difference between the transmit paths, and the phase difference between the receive paths. The phase difference of the channel may be estimated as the phase difference between the filtered channel estimates. Let $\Box(\bullet)$: $\Box^N \to [0,2\pi)^N$ denotes the angle operator and let $\Box(\hat{H}_1(f))$ and $\Box(\hat{H}_2(f))$ denote the phases of the channel estimates. Then, $$\phi_{Rx,2}(f) - \phi_{Rx,1}(f) = \Box(\hat{H}_2(f)) - \theta_{Rx,2} - (\Box(\hat{H}_1(f)) - \theta_{Rx,1}) + \eta \quad (2)$$
$$= \Box(\hat{H}_2(f)) - \Box(\hat{H}_1(f)) - (\theta_{Rx,2} - \theta_{Rx,1}) + \eta$$

where $\eta \in [-\pi,\pi)^N$ is a noise induced error term. Let $\theta_{Tx,2}-\theta_{Tx,1}$ denote the difference in phase between the first and second transmit paths and let $\hat{\phi}_{BB,1}$ and $\hat{\phi}_{BB,2}$ denote the phase of the signals applied to the transmit chains. To effect the desired output phase relationship, the phases of the signals applied to the transmitters may need to be compensated according to:

$$\hat{\phi}_{BB,2}-\hat{\phi}^{BB,1}=\phi_{Tx,2}-\phi_{Tx,1}+(\theta_{Tx,2}-\theta_{Tx,1}) \quad (3)$$

The phase differences $(\theta_{Rx,2}-\theta_{Rx,1})$ and $\theta_{Tx,2}-\theta_{Tx,1}$ vary with temperature, frequency, and from device to device and are not known exactly. We may estimate these quantities. When the estimated quantities are used in place of the actual values, equation (1) becomes $$\hat{\phi}_{BB,2} - \hat{\phi}_{BB,1} = -(\phi_{Rx,2}(f, t_{Rx}) - \phi_{Rx,1}(f, t_{Rx})) \qquad (4)$$
$$= -(\Box(\hat{H}_2(f)) - \Box(\hat{H}_1(f))) + (\hat{\theta}_{Rx,2} - \hat{\theta}_{Rx,1}) -$$
$$(\hat{\theta}_{Tx,2} - \hat{\theta}_{Tx,1})$$

By measuring the transmit phases and the receive phases to a common point, namely, at the directional couplers 124a and 124b, phase differences due to board layout may be drop out.

In an exemplary embodiment of the invention, the subscriber station 120 may be operable to assign or determine transmit phase differences between the antennas 122a-122b on a tile-by-tile basis. In OFDMA systems such as WiMAX, the uplink tiles span a narrow range of frequencies. Therefore, the channel typically varies by only a small amount across the tile and the channel for all subcarriers within this group may be effectively characterized by a single metric. In WiMAX systems, the set of tiles constituting a subchannel do not change during the uplink subframe. This may allow assignment of tiles to individual antennas without concern that subsequent assignment, on subsequent symbols, may result in the same tile being transmitted on different antennas on different symbols. This may be true even in the case of, for example, subchannel rotation in, WiMAX systems.

In an OFDM receiver, a frequency interference signal or a carrier wave (CW) signal may be orthogonal to the OFDM signal of interest. The CW signal may be present in the guard band at a frequency that corresponds to an integer number of subcarrier spacing. Hence, a calibration signal may be coupled into the directional coupler 124a, for example, down-converted with the signal without significantly degrading the receiver sensitivity. If the calibration signal is correlated over the useful symbol period, the received OFDM signal is orthogonal to the calibration signal, hence allowing accurate phase estimation to occur. Additionally, in OFDM, it may be desirable to use a single or common calibration source or signal and to switch the single calibration source between the directional couplers 124a-124b. In an exemplary embodiment of the invention, to avoid introducing interference when switching the single calibration source or signal between the directional couplers 124a-124b, it may be advantageous to switch the single calibration source or signal between the directional couplers 124a-124b during the cyclic prefix of corresponding OFDM symbols of the received OFDM signals. In instances where the subscriber station 120 is aware of receive timing, the subscriber station 120 may be in a position to accurately time or perform the switching.

The selection of the transmit phase relationship between the antenna 122a and the antenna 122b may be on a non-frequency selective basis. In this regard, a constant phase offset may be utilized to approximate the receive phase difference ($\theta_{Rx,2} - \theta_{Rx,1}$).

In an exemplary embodiment of the invention, the subscriber station 120 may be operable to dynamically select or adjust the transmit phase relationships between a plurality of antennas of the antenna array 122. For example, the subscriber, station 120 may dynamically adjust the phase relationships between antennas of the antenna array 122 based on receive signal characteristics associated with each antenna of the antenna array 122. These receiver signal characteristics may comprise receive signal strength, signal-to-noise ratio, signal strength, estimated interference power, and the variance of the received signal.

The subscriber station 120 may be operable to perform transmit antenna selection based on the receiver performance through each antenna of the antenna array 122. In this regard, the subscriber station 120 may determine one or more receiver antennas corresponding to the strongest receive power levels. One or more transmit antennas may be selected from the determined receiver antennas. The subscriber station 120 may be operable to adaptively select one or more transmit antennas based on the characterized channel qualities. In this regard, the transmission channel qualities may be characterized across the subcarriers of the multi-carrier signals. The subscriber station 120 may manage and control when to calibrate the transmit path associated with each of the selected transmit antennas in accordance with the assigned transmit phase differences.

In an exemplary embodiment of the invention, the subscriber station 120 may be operable to characterize transmission channel qualities associated with each of the antennas of the antenna array 122 on a frequency selective basis. For example, in instances where at least one received signal comprises pilot or reference tones of a preamble of a downlink sub-frame from the base station 110, the subscriber station 120 may characterize the pilot or reference tones of the received preamble. Specifically, the subscriber station 120 may characterize the pilot or reference tones of the received preamble if subcarriers of the preamble may overlap with one or more groups of subcarriers to be allocated to one or more transmit antennas during transmission.

Figure 2:
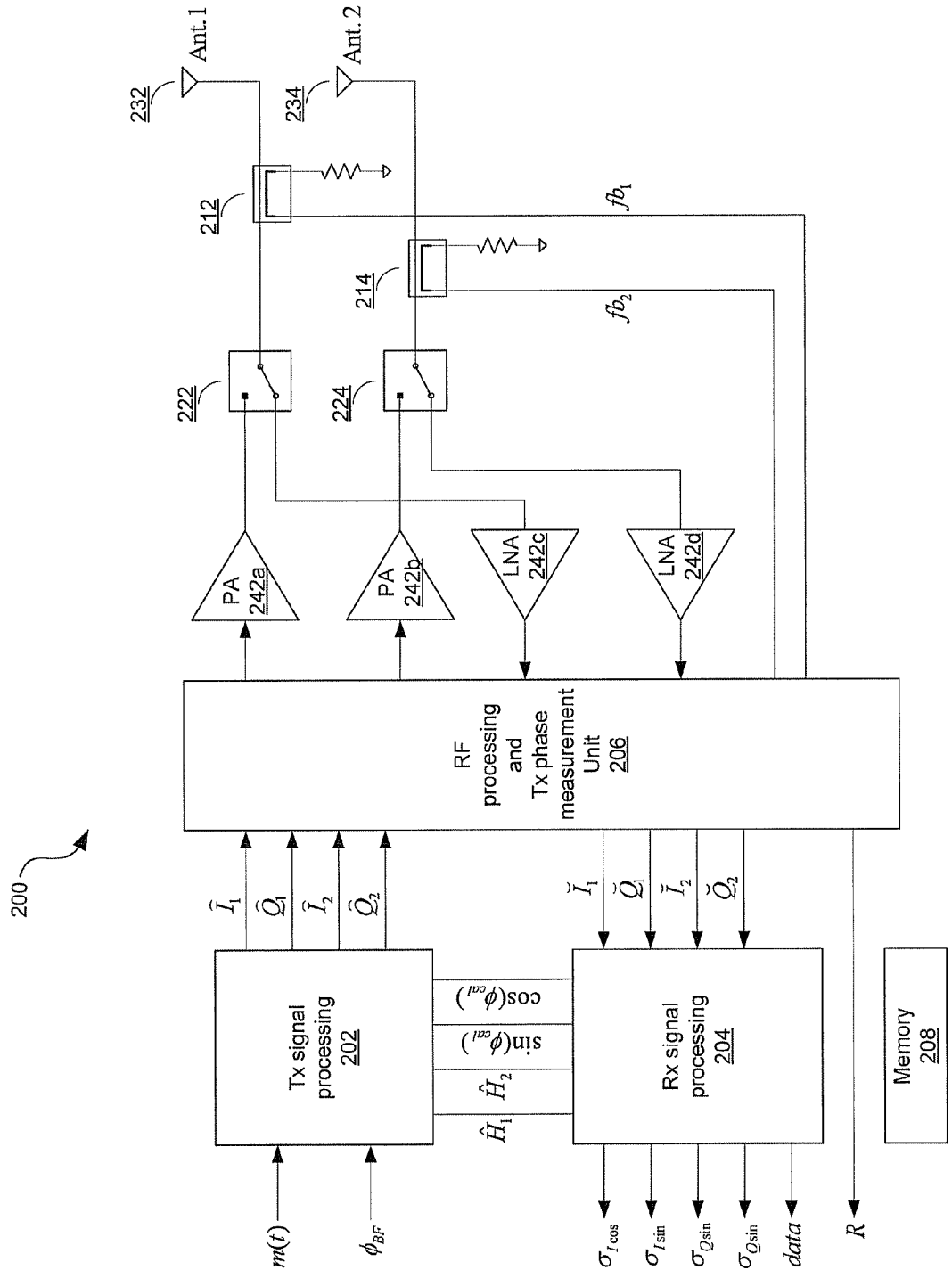
FIG. 2 is a block diagram illustrating an exemplary wireless transceiver that is operable to perform uplink beamforming, in accordance with an embodiment of the invention.

FIG. 2 is a block diagram illustrating an exemplary wireless transceiver that is operable to perform uplink beamforming, in accordance with an embodiment of the invention. Referring to FIG. 2, there is shown a subscriber station transceiver 200. The subscriber station transceiver 200 comprises a transmit (Tx) signal processing unit 202, a receive (Rx) signal processing unit 204, a RF signal processing and Tx phase measurement unit 206, a memory 208, power amplifiers 212 and 214, transmit/receive (T/R) switches 222 and 224, low noise amplifiers (LNAs) 242 and 244, RF directional couplers 252 and 254, and antennas 232 and 234.

The subscriber station transceiver 200 may comprise suitable logic, circuitry, interfaces and/or code that may be operable to receive and/or transmit radio frequency signals using various cellular communication technologies such as, for example, CDMA, GSM, UMTS, WiMAX, HSPA, and/or LTE.

The RF signal processing and Tx phase measurement unit 206 may comprise suitable logic, circuitry, interfaces and/or code that are operable to process RF signals communicated via antennas 232 and 234. In this regard, the RF signal processing and Tx phase measurement unit 206 may be operable to process RF signals received from the base station 110. The RF signal processing and Tx phase measurement unit 206 may convert the received RF signals to corresponding baseband signals and perform analog-to-digital conversion of the downconverted signals. The resulting digitized receive signals, denoted as $\check{I}_1, \check{Q}_1, \check{I}_2,$ and $\check{Q}_2$, may be communicated with the Rx signal processing unit 204 for further baseband processing. The RF signal processing and Tx phase measurement unit 206 may also be operable to process RF signals for transmission to the base station 110. The RF signal processing and Tx phase measurement unit 206 may receive digital baseband signals, denoted as $\hat{I}_1, \hat{Q}_1, \hat{I}_2,$ and $\hat{Q}_2$, from the Tx signal processing unit 202 and perform digital-to-analog conversion of the received digital baseband signals. The RF signal processing and Tx phase measurement unit 206 may be operable to convert the resulting analog baseband signals to corresponding RF signals for transmission via the antennas 232 and 234 to the base station 110.

A distinct RF directional coupler may be coupled to each one of the antennas 232 and 234. For example, the RF directional coupler 252 may be located between the T/R switch 222 and the antenna 232. Similarly, the RF directional coupler 254 may be located between the T/R switch 224 and antenna 234. The RF directional couplers 252 and 254 may provide samples of the RF transmit signals to the RF signal processing and Tx phase measurement unit 206 through feedback signals $fb_1$ and $fb_2$. The coupled output of the directional coupler 252, for example, may be approximately, for example, 18 dB below the input to the directional coupler 252. In this case, the loss of the directional coupler 252 is small as compared to the gains it affords or provides by enabling beamforming. In this regard, the amplitude and/or the phase delays of the corresponding RF transmit signals input to the RF couplers 252 and 254 may be measured or calculated by subsequent processing of these feedback signals. The amplitude and/or phase delay measurements may be utilized to characterize and/or adjust the transmit phase relationship between antennas of the antennas 232 and 234.

The Tx signal processing unit 202 may comprise suitable logic, circuitry, interfaces and/or code that may be operable to manage and/or control operations of the RF signal processing and Tx phase measurement unit 206. The Tx signal processing unit 202 is further described in detail in FIG. 5. In an exemplary embodiment of the invention, the Tx signal processing unit 202 may be operable to determine a phase difference between the baseband transmission paths associated with the antennas 232 and 234. The Tx signal processing unit 202 may apply the determined phase difference to various operations such as performing an inverse Discrete Fourier Transform (IDFT), upsampling and/or filtering the output of IDFT signal.

The Rx signal processing unit 204 may comprise suitable logic, circuitry, interfaces and/or code that may be operable to manage and/or control operations of the RF signal processing and Tx phase measurement unit 206. The Rx signal processing unit 204 may perform various baseband procedures such as channel estimation, frequency tracking or estimation, demodulation of the receive signals, and estimation of the receiver phase in conjunction with the calibration signals. The Rx signal processing unit 204 is further described in detail in FIG. 4.

The memory 208 may comprise suitable logic, circuitry, interfaces and/or code that may be operable to store information such as executable instructions and data that may be utilized by the Rx signal processing unit 204, the Tx signal processing unit 202 and/or other device components such as, for example, the RF signal processing and Tx phase measurement unit 206. The memory 208 may comprise RAM, ROM, low latency nonvolatile memory such as flash memory and/or other suitable electronic data storage.

In an exemplary operation, baseband signals may be communicated between the Tx signal processing unit 202 and the RF signal processing and Tx phase measurement unit 206. For example, assume that $(\hat{I}_1, \hat{Q}_1)$ and $(\check{I}_1, \check{Q}_1)$ are the baseband signals that are transmitted and received, respectively, via the antenna 232. $(\hat{I}_2, \hat{Q}_2)$ and $(\check{I}_2, \check{Q}_2)$ are the baseband signals that are transmitted and received, respectively, via the antenna 234. In various exemplary embodiments of the invention, the Rx signal processing unit 204 may utilize the received $(\check{I}_1, \check{Q}_1)$ and $(\check{I}_2, \check{Q}_2)$ to characterize the receive channels associated with the antennas 232 and 234. Characteristics of the receive channels include amplitude, capacity, signal strength, MIMO capacity, and equivalent SINR. The Rx signal processing unit 204 may be operable to correlate at least one of the received $(\check{I}_1, \check{Q}_1)$ and $(\check{I}_2, \check{Q}_2)$ with a sinusoidal signal to measure the phase of the receive paths associated with the antennas 232 and 234, respectively. The sinusoidal signal may be generated using a numerically controlled oscillator (NCO) in conjunction with a lookup table, for example, to generate the sine and cosine values of the NCO phase $\phi_{cal}$. The NCO phase $\phi_{cal}$ may be profitably coupled to the RF signal processing and Tx phase measurement unit 206. In this way, the phase $\phi_{cal}$ of the NCO is common to both the calibration signal and the correlation measurement and therefore, the initial phase of the NCO is immaterial.

As seen in equation (4) above, three phase relationships, namely, the actual phase difference between the wireless channels, the phase difference between the transmit paths, and the phase difference between the receive paths, need to be considered in order to optimally compute the transmit phase difference to be applied during transmission. In this regard, the phase difference of the wireless channels may be generally frequency selectively. The phase difference between the transmit paths, $\theta_{Tx,2}-\theta_{Tx,1}$, and the phase difference between the receive paths, $\theta_{Rx,2}-\theta_{Rx,1}$, may be generally a weak function of frequency. Hence, we may compensate for both the receiver and transmitter phase differences with a single or common term, $\phi_{BF}=\hat{\theta}_{Rx,2}-\hat{\theta}_{Rx,1}-(\hat{\theta}_{Tx,2}-\hat{\theta}_{Tx,1})$. The frequency selective phase correction $\Box(\hat{H}_1(f))-\Box(\hat{H}_2(f))$ may be applied by communicating channel estimates $\hat{H}_1(f)$ and $\hat{H}_2(f)$ from the Rx signal processing unit 204 to the Tx signal processing unit 202 as shown. Separately applying the frequency selective phase difference $\Box(\hat{H}_1(f))-\Box(\hat{H}_2(f))$ and $\phi_{BF}$ may afford an additional advantage, namely, the transmit phase component of $\phi_{BF}$ may be estimated and compensated at the beginning of an uplink transmission, hence reducing the latency of this phase term.

In an exemplary embodiment of the invention, the measurement of the transmit phase of each transmit path may be accomplished or determined by correlating the selected directional coupler output with the corresponding transmit signal applied to the transmit path.

Figure 3:
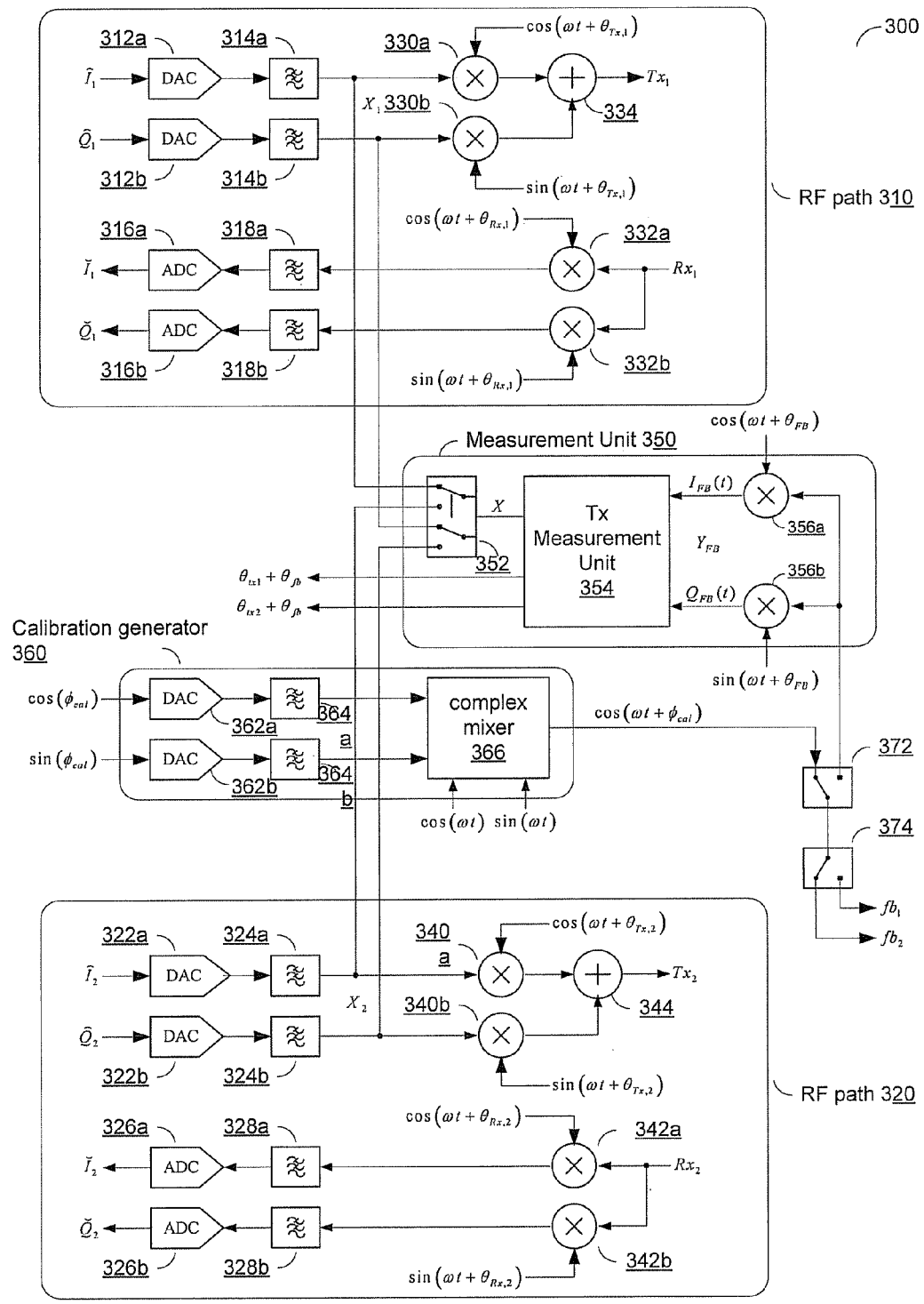
FIG. 3 is a block diagram illustrating an exemplary radio frequency (RF) signal processing unit that may be utilized for uplink beamforming calibration, in accordance with an embodiment of the invention.

FIG. 3 is a block diagram illustrating an exemplary radio frequency (RF) signal processing unit that may be utilized for uplink beamforming calibration, in accordance with an embodiment of the invention. Referring to FIG. 3, there is shown a RF signal processing unit 300 comprising a plurality of RF paths such as RF paths 310-320, a calibration generator 360, a measurement unit 350, and two switches 372 and 374. The two switches 372 and 374 may provide an ability to switch feedback ports fb1 and fb2 to either connect to the Tx measurement unit 350 or the calibration generator unit 360.

The RF path 310 comprises digital-to-analog converter (DACs) 312a-312b, analog-to-digital converter (ADCs) 316a-316b, (low pass) filters 314a-314b, and 318a-318b, transmit mixers 330a-330b, receive mixers 332a-332b, and adder 334. The RF path 320 comprises DACs 322a-322b, ADCs 326a-326b, (low pass) filters 324a-324b, and 328a-328b, transmit mixers 340a-340b, adder 344, and receive mixers 332a-332b.

The measurement unit 350 comprises of a switch 352, down conversion mixers 356a-356b, and a Tx measurement unit 354. The Tx measurement unit 354 may comprise suitable logic, circuitry, interfaces and/or code that may be operable to measure the amplitude and/or the phase of transmit signals. The measurement unit 350 may process, feedback signals, $fb_1$ and $fb_2$, to control the calibration of the amplitude and/or phase of the transmit signals through the antenna 232 and the antenna 234, respectively. The feedback path signal is down converted and may be denoted as a vector signal $Y_{FB}$, which comprises the real and imaginary components of the baseband signal.

The switch 352 is configured to select between one of the pairs of baseband analog transmit signals, from $X_1$ and $X_2$ to provide a sleeted signal, X, to the Tx measurement unit 354. In an embodiment, the feedback path switches 374 and 372 are configured to route the corresponding feedback path signal to the Tx measurement unit 354 for processing; that is, to measure the relative phase difference between the selected pair of baseband analog transmit signals and the transmitter output corresponding to the selected pair of baseband analog transmit signals. In this way, the phase of the selected transmitter chain may be measured. In an alternate embodiment, a pair of baseband analog transmit signals applied to a first transmit pair may be measured with respect to the feedback path of a second transmit path. This embodiment may be profitably used if the transmit path employs a multiport network between the power amplifiers and the directional couplers.

Figure 4:
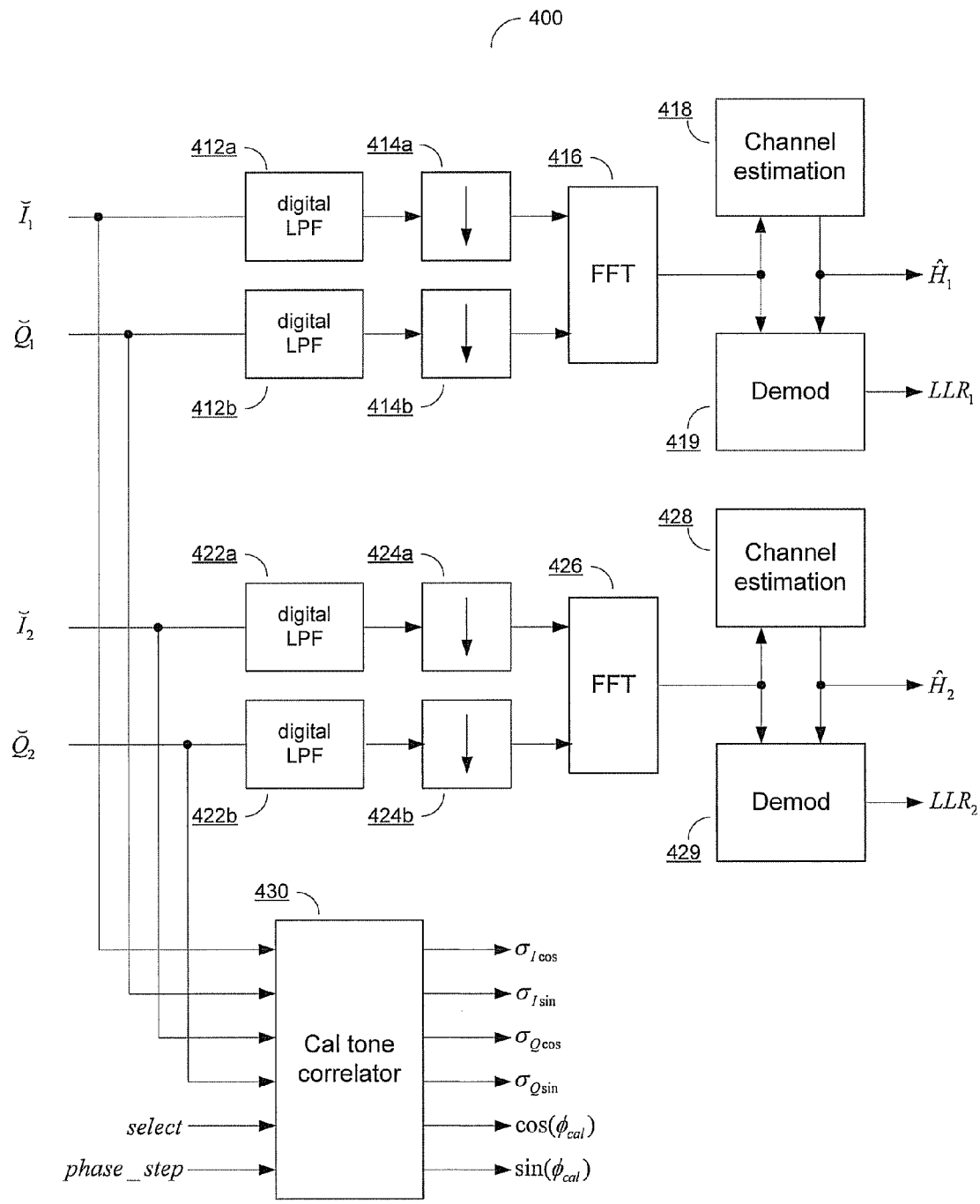
FIG. 4 is a block diagram illustrating an exemplary baseband receive digital signal processing unit that may be utilized for beamforming, in accordance with an embodiment of the invention.

The transmit signals $X_1$ and $X_2$ commonly undergo a phase shift through the RF sections of the subscriber station 120. The exact phase shift is unknown and varies. This phase shift may be caused by several on chip and off chip components such as transmit mixer, local oscillator phase differences, RF amplifiers, matching networks, Power Amplifier (PA), and directional coupler. In instances where the subscriber 200 is transmitting and $fb_1$ is selected, the coupled path connection to the feedback circuit may create an additional phase shift. The coupled feedback signal, $Y_{FB}$ may have an uncertain relationship to the baseband transmit signal $X_1$ used for up conversion. In addition to the phase shift, the transmit signal may also comprise an unknown gain. The nominal gain experienced by the signal path may be predicted or estimated, but the variation from part to part, and temperature and bias conditions can result in large gain variation between $X_1$ and $Y_{FB}$. The same uncertainties may apply to the transmission of $X_2$ and the feedback path when $fb_2$ is selected. In an exemplary embodiment of the invention, the Tx measurement unit 354 may be used to estimate the gain and phase difference between these two signals. Let us define $Y_{FB}$ such that:

$$Y_{FB} = \begin{bmatrix} I_{FB}(t) \\ Q_{FB}(t) \end{bmatrix} \quad (5)$$

where $I_{FB}(t)$ and $Q_{FB}(t)$ shown in FIG. 3, are respectively the real and imaginary parts of the complex feedback signal $Y_{FB}$, such that $$I_{FB}(t) = \Re(Y_{FB}(t)), \; Q_{FB}(t) = \Im(Y_{FB}(t)). \quad (6)$$

where $\Re(\cdot): \square \rightarrow \square$ and $\Im(\cdot): \square \rightarrow \square$ represent the operation of extracting the real and imaginary components of a complex value. Signals $X_1$ and $X_2$, as shown in FIG. 4, may be defined as:

$$X_1(t) = \begin{bmatrix} \hat{I}_1(t) \\ \hat{Q}_1(t) \end{bmatrix} \quad (7)$$

and $$X_2(t) = \begin{bmatrix} \hat{I}_2(t) \\ \hat{Q}_2(t) \end{bmatrix}. \quad (8)$$

Equivalently, $$\hat{I}_1(t) = \Re(X_1(t)) \; \hat{Q}(t) = \Im(X_1(t)) \quad (9)$$

$$\hat{I}_2(t) = \Re(X_2(t)) \; \hat{Q}(t) = \Im(X_2(t)) \quad (10)$$

The switches 374 and 372 in FIG. 3, may be configured such that the feedback signal $Y_{FB}$ is a sample of the first feedback signal $fb_1$. Under this configuration, the feedback signal $Y_{FB}$ may be expressed in the following matrix form:

$$\begin{bmatrix} I_{FB}(t) \\ Q_{FB}(t) \end{bmatrix} = g_1 \begin{bmatrix} \cos(\theta_{Tx,1} + \theta_{fb}) & \sin(\theta_{Tx,1} + \theta_{fb}) \\ -\sin(\theta_{Tx,1} + \theta_{fb}) & \cos(\theta_{Tx,1} + \theta_{fb}) \end{bmatrix} \begin{bmatrix} \hat{I}_1(t) \\ \hat{Q}_1(t) \end{bmatrix}, \quad (11)$$

where the terms $g_1$ and $\theta_{Tx,1} + \theta_{fb}$, denote the relative gain and phase of the feedback signal with respect to the first transmit signal. Further, the phase may be expressed as a sum of two terms, such that $\theta_{Tx,1}$ represents the phase of the first transmit path that comprises the phase shift up to the directional coupler 252, for example, and $\theta_{fb}$, may represent the phase of the feedback coupled path. The following equation represents a more general relationship between the first transmit signal and the feedback signal.

$$\begin{bmatrix} I_{FB}(t) \\ Q_{FB}(t) \end{bmatrix} = \begin{bmatrix} m_{11} & m_{12} \\ m_{21} & m_{22} \end{bmatrix} \begin{bmatrix} \hat{I}_1(t) \\ \hat{Q}_1(t) \end{bmatrix} + \begin{bmatrix} O_{I1} \\ O_{Q1} \end{bmatrix} \quad (12)$$

where the matrix $$\begin{bmatrix} m_{11} & m_{12} \\ m_{21} & m_{22} \end{bmatrix}$$

denotes an impairment experienced by the feedback signal that is proportional to the input signal, and the matrix $$\begin{bmatrix} O_{I1} \\ O_{Q1} \end{bmatrix}$$

represents an constant offset term that is independent of the input signal.

In an exemplary embodiment of the invention, the switch 352 of FIG. 3 may be chosen such that the Tx measurement unit 354 may have simultaneous access to both the first transmit signal $X_1$ and the feedback signal $Y_{FB}$. The Tx measurement unit 354 may compute the correlation terms $$R_{XX} = \sum_{i=1}^{N_{samples}} XX^T \in \square^{2 \times 2} \text{ and } R_{YX} = \sum_{i=1}^{N_{samples}} Y_{FB} X^T \in \square^{2 \times 2}$$

over a plurality of samples $N_{samples}$, which may be chosen to correspond to a period of approximately 5 us, for example, so as to allow the phase and/or gain to be measured and compensated at the beginning of an uplink transmission. In an alternate embodiment, $N_{samples}$ may be chosen to correspond to a transmit symbol period. An increased correlation period generally results in improved estimation accuracy.

A matrix of impairments M may be computed by:

$$M = \begin{bmatrix} m_{11} & m_{12} \\ m_{21} & m_{22} \end{bmatrix} = R_{YX} R_{XX}^{-1} = \left[\sum Y_{FB} X^T\right]\left[\sum X_1 X^T\right]^{-1} \quad (13)$$

Subsequently, the constituent gain and phase of the first transmit signal may be derived as $$g_1 = \sqrt{\frac{m_{11}^2 + m_{12}^2 + m_{21}^2 + m_{22}^2}{2}} \quad (14)$$

and, $$\theta_{Tx,1} + \theta_{fb} = \frac{\angle(m_{11} - jm_{21}) + \angle(m_{22} + jm_{12})}{2} \quad (15)$$

In an exemplary embodiment of the invention, the respective gain and phase terms $g_2$, and $\theta_{tx,2} + \theta_{fb}$, of the second transmit signal may be similarly computed by configuring switch 352 to select $X=X_2$ and configuring switches 372 and 374 to cause or trigger $Y_{FB}$ to be coupled to signal $fb_2$. Equations (11) through (15) may now be re-applied to calculate the gain and phase terms of the second transmit path.

The calibration generator 360 may comprise suitable logic, circuitry, interfaces and/or code that may be operable to create a modulated signal $\cos(\omega t + \phi_{cal}(t))$, where $\omega 0$ is the angular frequency corresponding to the center frequency of the received signal. In an embodiment, $\phi_{cal}(t)=n\Delta ft$, $n\epsilon\Box$ and $\Delta f$ may represent the subcarrier spacing. In this regard, the calibration signal is a continuous wave signal that appears at an integer frequency offset relative to the received OFDM signal. The calibration signal may be coupled through feedback signals $fb_1$ and $fb_2$, to the RF couplers 252 and 254, for example. In an embodiment, a common phase $\phi_{cal}(t)$ may be utilized to generate both the receive calibration and the correlation of the downconverted receive signals. Recall from Equation (4) that:

$$\hat{\phi}_{BB,2} - \hat{\phi}_{BB,1} = -(\Box(\hat{H}_2(f) - \Box(\hat{H}_1(f)) + (\hat{\theta}_{Rx,2} - \hat{\theta}_{Rx,1}) - (\hat{\theta}_{Tx,2} - \hat{\theta}_{Tx,1}).$$

The advantage of using the directional coupler for both receive and transmit calibration and a common path for both the transmit and receive calibration may now be appreciated. As any phase delay in the feedback path to a first directional couplers is common to both the estimated transmit and receive phase estimates, the phase delay of the feedback cancels from the correction term $\hat{\phi}_{BB,2} - \hat{\phi}_{BB,1} = (\hat{\theta}_{Rx,2} - \hat{\theta}_{Rx,1}) - (\hat{\theta}_{Tx,2} - \hat{\theta}_{Tx,1})$. Hence, the accuracy of the beamforming phase calibration is not affected by phase variation in the feedback path arising from manufacturing variations or circuit board layout.

In operation, the RF signal processing unit 300 may be operable to perform RF processing for transmitting and receive signals. The RF path 310 may be utilized to process RF signals communicated via the antenna 232. The RF path 320 may be utilized to process RF signals communicated via the antenna 234. In an embodiment, RF paths 310 and 320 are equivalent.

FIG. 4 is a block diagram illustrating an exemplary baseband receive digital signal processing unit that may be utilized for beamforming, in accordance with an embodiment of the invention. Referring to FIG. 4, there is shown a digital signal processing unit 400 comprising a plurality of baseband (BB) processing paths such as BB paths 410-420, and a cal-tone correlator 430. The BB path 410 comprises digital low pass filters (LPF) 412a-412b, decimators 414a-414b, a FFT module 416, a channel estimation unit 418, and a demodulator 419. The BB path 420 comprises LPFs 422a-422b, decimators 424a-424b, a FFT module 426, a channel estimation unit 428, and a demodulator 429.

The BB path 410 may comprise suitable logic, circuitry and/or interfaces that is operable to process baseband signals corresponding to RF signals communicated via the antenna 232.

The digital LPF 412a and the decimator 414a may comprise suitable logic, circuitry, interfaces and/or code that are operable to process I components of the baseband signals. The digital LPF 412b and the decimator 414b may comprise suitable logic, circuitry, interfaces and/or code that are operable to process Q components of the baseband signals. The outputs of the decimators 414a and 414b may be input to the FFT module 416.

The FFT module 416 may comprise suitable logic, circuitry, interfaces and/or code that may be operable to perform FFT operation on the input signals to convert the baseband samples in time domain into corresponding samples in frequency domain.

The channel estimation unit 418 may comprise suitable logic, circuitry, interfaces and/or code that may be operable to estimate channel utilizing the samples in frequency domain from the output of the FFT module 416.

The demodulator 419 may comprise suitable logic, circuitry, interfaces and/or code that may be operable to demodulate the samples in frequency domain from the output of the FFT module 416 in order to extract information, transmitted from the base station 110, from the received RF signals via the antenna 232.

The BB path 420 processes corresponding baseband signals for RF signals communicated via the antenna 234.

The digital LPF 422a and the decimator 424a may comprise suitable logic, circuitry, interfaces and/or code that are operable to process I components of the baseband signals. The digital LPF 422b and the decimator 424b may comprise suitable logic, circuitry, interfaces and/or code that are operable to process Q components of the baseband signals. The outputs of the decimators 414a and 414b may input to the FFT module 426.

The FFT module 426 may comprise suitable logic, circuitry, interfaces and/or code that may be operable to perform FFT operation on the input signals to convert the baseband samples in time domain into corresponding samples in frequency domain.

The channel estimation unit 428 may comprise suitable logic, circuitry, interfaces and/or code that may be operable to estimate channel utilizing the samples in frequency domain from the output of the FFT module 426.

The demodulator 429 may comprise suitable logic, circuitry, interfaces and/or code that may be operable to demodulate the samples in frequency domain in order to extract information, transmitted from the base station 110, from the received RF signals via the antenna 234.

The outputs of channels estimation units 418 and 428, denoted $\hat{H}_1(f)$ and $\hat{H}_2(f)$, may be applied to baseband transmit digital signal processing to produced a desired frequency selective phase shift between the antennas according to Equation (4).

The cal-tone correlator 430 may comprise suitable logic, circuitry, interfaces and/or code that may be operable to correlate the digitized downconverted RF signals with a baseband equivalent of the RF calibration signal applied through a directional coupler through a feedback signal. The RF calibration signal may be applied through a signal that is shared with the transmit phase estimation circuitry. The RF calibration signal may be applied through package pin that is shared between transmit and receive phase estimation. The digitized downconverted RF signals for the first antenna 232 are denoted as $\check{I}_1$ and $\check{Q}_1$; The digitized downconverted RF signals for the second antenna 234 are denoted as $\check{I}_2$ and $\check{Q}_2$. The output of the cal-tone correlator 430 may be accumulated to calculate the complex amplitude of the baseband equivalent response of a receive RF path. The complex amplitude of two or more receive paths may be measured and the phase difference between the two measured receive paths may be computed. The measured receive path phase difference may be used to compensate the measured channel phase differences when computing a desired transmit phase according to Equation (4). In addition, the cal-tone correlator 430 may output the signals used in the correlation accumulation $\sin(\phi_{cal}(t))$, $\cos(\phi_{cal}(t))$. These signals may be advantageously coupled to the calibration modulator 360. If the calibration modulator is responsive to the signal used in the correlation, the absolute value of the phase $\phi_{cal}(t)$ need not be compensated for.

The calculated receive power levels over the one or more groups of subcarriers may be utilized to calibrate subsequent received signals, and may also be applied to calibrate transmit power level and transmit phase correction. In this regard, the wireless transceiver 200 may be operable to calibrate the receive path and transmit path for each of antennas 232 and 234.

In an exemplary operation, RF signals received via the antenna 232 and the antenna 234 may be RF processed over the RF path 310 and the RF path 320, respectively. The resulting baseband I and Q components may be processed by the BB paths 410 and 420. The digital signal processing unit 400 may be operable to evaluate the characteristics of the receive channel and the characteristics of the receiver path associated with each of the antennas 232 and 234. The phase shifts and amplitudes associates with the cal tone correlator 430 may be used in conjunction with the channel estimates in selecting a desired transmit phase according to Equation (4).

Figure 5:
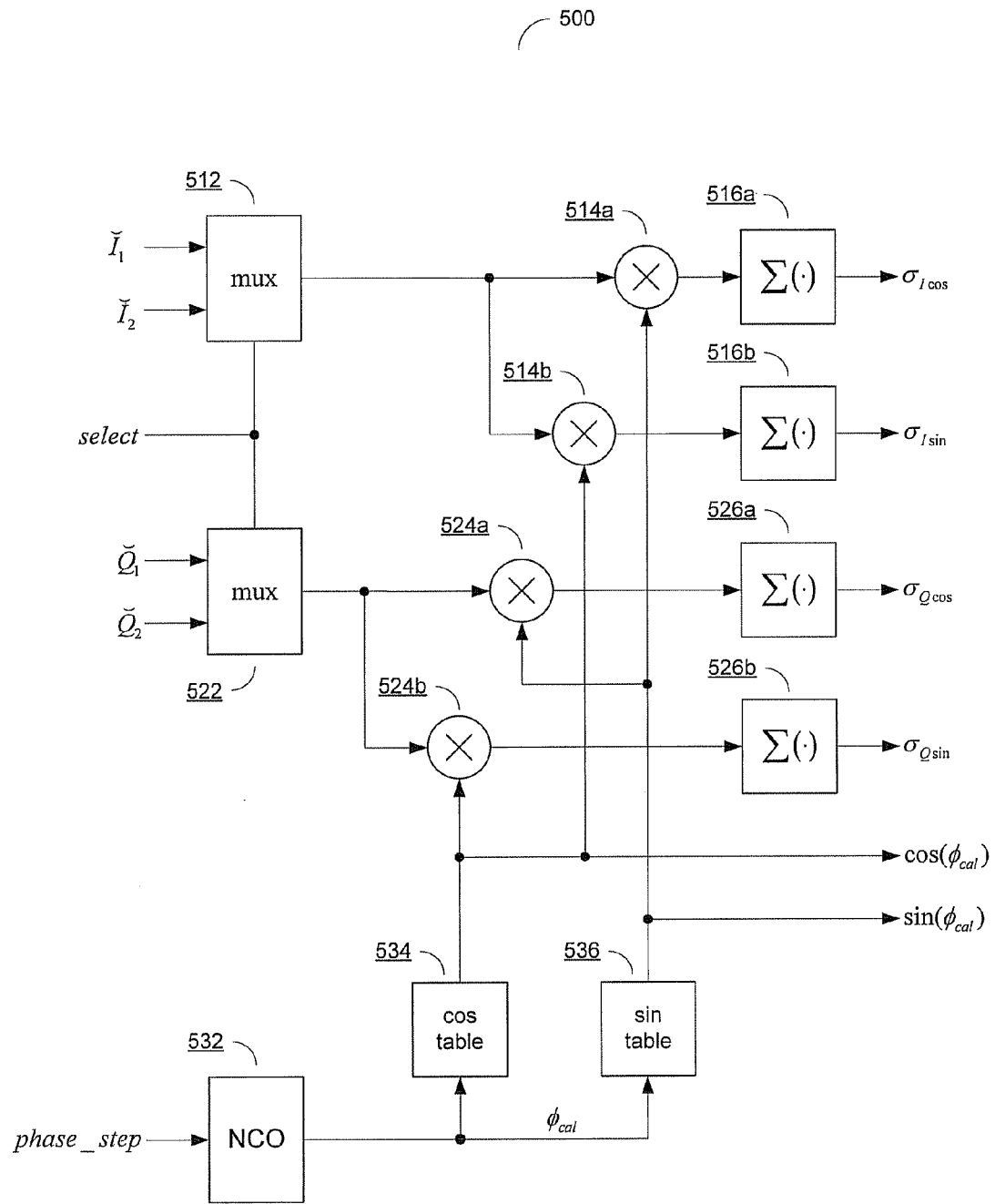
FIG. 5 is a block diagram illustrating an exemplary caltone correlation unit 430, that may be utilized for beamforming, in accordance with an embodiment of the invention.

FIG. 5 is a block diagram illustrating an exemplary cal-tone correlation unit 430, that may be utilized for beamforming, in accordance with an embodiment of the invention. Referring to FIG. 5, there is shown a calibration tone (cal-tone) correlator 500 comprising an I path 510, a Q path 520, a numerically controlled oscillator (NCO) 532, a cos table 534 and a sin table 536.

The I path 510 may comprise suitable logic, circuitry, and/or interfaces that is operable to process I components of baseband signals corresponding to RF signals communicated from the receive path of antennas 232 and 234. The Q path 520 may comprise suitable logic, circuitry, interfaces and/or code that is operable to process Q components of the received signals.

The multiplexer (MUX) 512 may comprise suitable logic, circuitry, interfaces and/or code that may be operable to multiplex I components of the received baseband signals. The multiplexer (MUX) 522 may comprise suitable logic, circuitry, interfaces and/or code that may be operable to multiplex Q components of received baseband signals.

The mixer 514*a* may comprise suitable logic, circuitry, interfaces and/or code that may be operable to mix the multiplexed I components $(\check{I}_1, \check{I}_2)$ with $\cos(\phi_{Cal}(t))$, where $\phi_{Cal}(t)$ may be generated by the NCO 532.

The mixer 514*b* may comprise suitable logic, circuitry, interfaces and/or code that may be operable to mix the multiplexed I components $(\check{I}_1, \check{I}_2)$ with $\sin(\phi_{Cal}(t))$, where $\phi_{Cal}(t)$ may be generated by the NCO 532. The cal tone correlator 500 may be utilized during the receive duration of a TDD communication system. In such a suitable interval, the cal tone generator 360 may be enabled to produce or generate a calibration signal. The generated calibration signal may be a sinusoid of frequency ω that may be chosen such that the sinusoid of frequency ω corresponds or equals to an integer multiple of the sub-carrier spacing in an OFDM communication system such as WiMAX. In an exemplary embodiment of the invention, the integer multiple may be chosen such that the calibration sinusoid may be added to the received signal while avoiding interference with the desired received signal. For example, in an exemplary WiMAX communication of 10 MHz channel bandwidth, the desired receive OFDM signal occupies tones −420 to +420. The calibration tone index may be selected to be greater than index 420, thus avoiding interference with the received signal. The calibration signal may be turned ON only for a part of the received signal duration. The calibration signal may be kept OFF for extended period of time, while utilizing an already know calibration value.

The calibration signal generated by 360 is coupled to the first receive signal through the coupled path fb$_1$, the directional coupler 252, the transmit/receive switch 222, and the LNA 242. In an exemplary embodiment of the invention, the calibration signal generated by 360 may be coupled to the second receive signal through the coupled path fb$_2$, the directional coupler 254, the transmit/receive switch 224, and the LNA 244.

In an exemplary embodiment of the invention, the cal tone correlator 500 may be utilized to correlate the calibration tone present in the received signal $(\check{I}_1, \check{Q}_1)$ and/or $(\check{I}_2, \check{Q}_2)$ to that of a sinusoid of known phase $\phi_{cal}(t)$ generated with by the NCO 532.

The mixer 524*b* may comprise suitable logic, circuitry, interfaces and/or code that may be operable to mix the multiplexed Q components $(\check{Q}_1, \check{Q}_2)$ with $\cos(\phi_{Cal}(t))$, where $\phi_{Cal}(t)$ may be generated by the NCO 530.

The mixer 524*b* may comprise suitable logic, circuitry, interfaces and/or code that may be operable to mix the multiplexed Q components $(\check{Q}_1, \check{Q}_2)$ with $\sin(\phi_{Cal}(t))$, where $\phi_{Cal}(t)$ may be generated by the NCO 530.

The integrators 516*a*-516*b* and 526*a*-526*b* may comprise suitable logic, circuitry, interfaces and/or code that may be operable to accumulate the output signals from the mixers 514*a*-514*b* and 524*a*-524*b*, respectively. In this regard, the integration widow utilized by the integrators 516*a*-516*b* and 526*a*-526*b* may comprise of one or more OFDM symbols in accordance with the properties of the received signal.

The NCO 530 may comprise suitable logic, circuitry, interfaces and/or code that may be operable to provide a phase $\phi_{cal}(t)$ to the cos table 532 and the sin table 534. The outputs of the cos table 532 and the sin table 534 may be communicated to the I path 510 and the Q path 520 to perform phase calibration of the receive path.

The cos table 532 is a sine look-up table that provides a cos value for angles generated by the NCO 530.

The sin table 534 is a sine look-up table that provides a sin value for angles generated by the NCO 530.

In an exemplary operation, the MUX 512 may be operable to multiplex I components of the baseband signals over the antennas 232 and 234. The multiplexed I components may be 90-degree phase shifted for the given receive phase estimate $\phi_{cal}$. For example, the multiplexed I components may be mixed via the mixer 514a with $\sin(\phi_{cal})$ and may be mixed via the mixer 514b with $\cos(\phi_{cal})$, respectively. The integrator 516a may be operable to accumulate the output of the mixer 514a to generate a receive power level imbalance over the I path 510 in terms of $\sin(\phi_{cal})$. The integrator 516b may be operable to accumulate the output of the mixer 514b to generate a receive power level imbalance over the I path 510 in terms of $\cos(\phi_{cal})$. Similarly, the MUX 522 may be operable to multiplex Q components of the baseband signals over the antennas 232 and 234. The multiplexed Q components may be phase 90-degree phase shifted for the given receive phase estimate $\phi_{cal}$. The resulting phase shifted Q components may be utilized to generate a receive power level imbalance over the Q path 510 in terms of $\cos(\phi_{cal})$ and $\sin(\phi_{cal})$, respectively.

Figure 6:
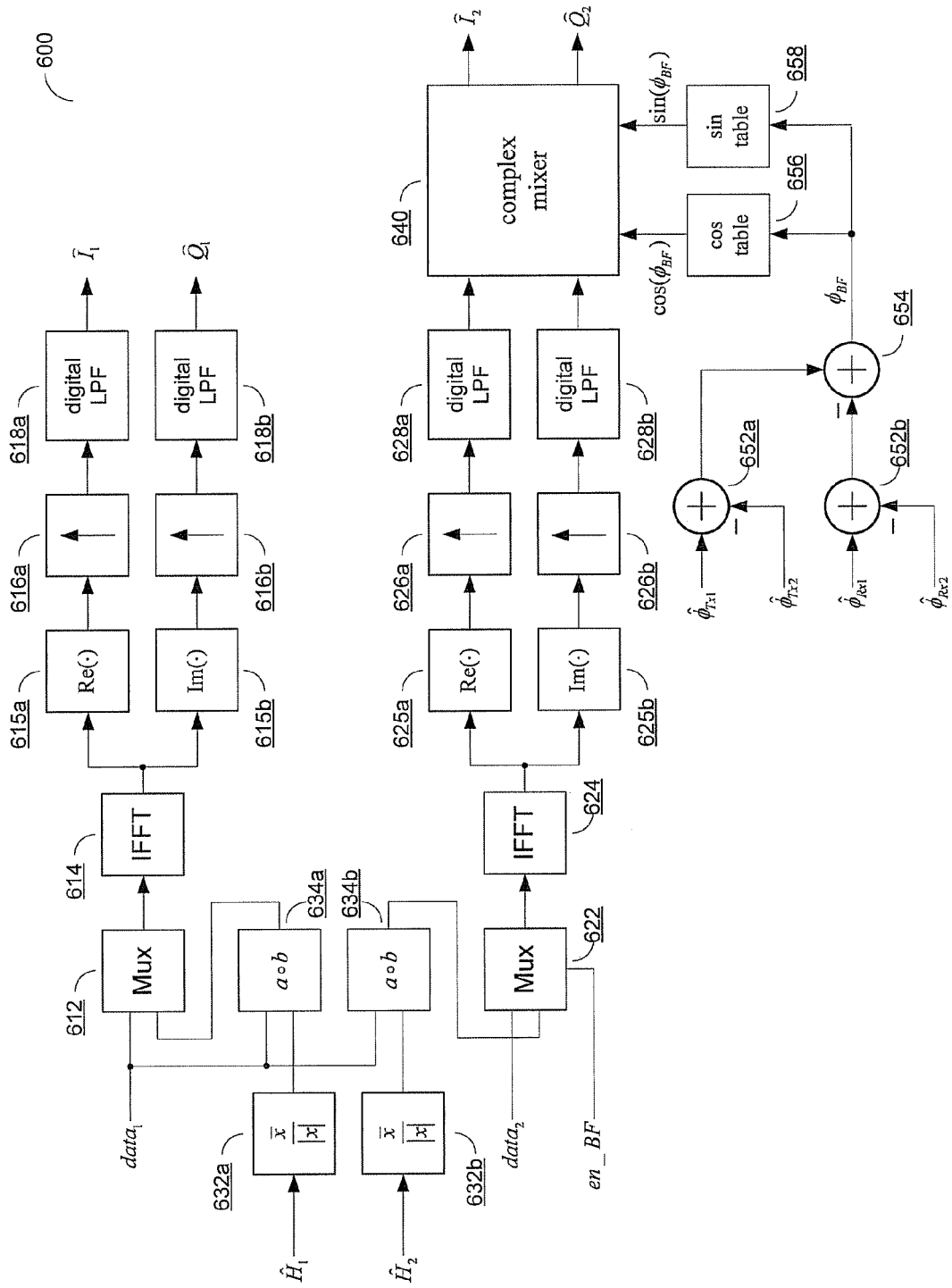
FIG. 6 shows an exemplary block diagram of a Tx signal processing subsystem, in accordance with an embodiment of the invention.

FIG. 6 shows an exemplary block diagram of a Tx signal processing subsystem, in accordance with an embodiment of the invention. Referring to FIG. 6, there is shown a Tx signal processing subsystem 600. The Tx signal processing subsystem 600 comprises of two transmit data path chains 610 and 620, a data stream multiplexing unit 630, and dynamic phase adjuster 660. The Tx signal processing subsystem may accept two input data streams data1 and data2, and may be utilized to support various transmit modes including: transmitting a single spatial stream without beamfoming, beamforming a single spatial stream, and transmitting two spatial streams. In the case of transmitting a single spatial stream. The selected data, either data$_1$ or data$_2$ is applied to the corresponding input of IFFT blocks 614 or 624. In the case of beamforming a single spatial stream, the frequency domain modulating data is applied to input data$_1$. In an embodiment, the channel estimates from associated with antennas 1 and 2, $\hat{H}_1(f)$ and $\hat{H}_2(f)$ may be applied to processing blocks 632a and 632b respectively. The operation of processing blocks 632a and 632b is to a vector of unit amplitude signals whose phase is the complex conjugate of its input. The outputs of blocks 632a and 632b are applied to vector multipliers 634a and 634b. Vector multipliers 6634a and 634b are additionally responsive to input data$_1$. The effect of blocks 632a and 632b is to apply a phase correction to the transmit symbol on a frequency selective basis, such that the output of vector multiples 634a and 634b will represent a complex conjugate inverse of the channel response as measured by the corresponding receive channels. The multiplex blocks 612 and 622 may be setup to transmit data stream data, through first transmit channel 610, and the vector multiplied version of the same data stream through the second transmit channel 620. The mux switches 612 and 622 can be used to transmit two independent data streams data$_1$ and data$_2$.

Tx signal path 610 may accept a transmit signal specified in frequency domain. The IFFT operation 614 converts the input signal to time domain. The real and imaginary data stream are processed separately using the upsampler 616, and digital filter 618. Similarly, the second Tx signal path 620 converts the input frequency domain signal to time domain using the IFFT block 624, and process the real and imaginary signals utilizing upsampler 626 and digital filter 628. The dynamic phase adjuster 660 can accept four input phase numbers $\hat{\phi}_{Tx,1}$, $\hat{\phi}_{Tx,2}$, $\hat{\phi}_{Rx,1}$, and $\hat{\phi}_{Rx,2}$. The adder components 652 and 654 compute the difference of these phase and produces a beam forming phase $\phi_{BF}$. Any one of the input phase numbers are allowed to change dynamically as a function of time. The cos table 656 and sin table 658, and the complex mixer 640 are used to apply the beam forming correction $\phi_{BF}$ to the second transmit signal ($\hat{I}_2, \hat{Q}_2$). In some communication systems, for example, the 3GPP Long Term Evolution LTE, the Base Stations employ a plurality of transmit antennas. The pilots associated with these said plurality of transmit antennas may be allocated such that the subscriber station may learn the full MIMO channel between the base station and the subscriber station. Let $\hat{H}$ denote the MIMO downlink channel and $\hat{H}=\check{H}^T$ the MIMO uplink channel.

$$\qquad (16)$$

In the case of two subscriber antennas, $\hat{H}\in\square^{M\times 2}$ is the UL propagation channel and $\check{H}\in\square^{2\times M}$ is the DL propagation channel. Here, M is the number of transmit antennas at the Base station. The received downlink signal is given by $$y_{SS}=\check{H}\check{s}+n\in\square^2, \qquad (17)$$

where is the signal transmitted by the BS, $\theta\in\square^2$ is a vector of additive noises. The received uplink signal is given by $$y_{BS}=\hat{H}\hat{s}+n\in\square^M. \qquad (18)$$

In the case of a subscriber station transmitting a single spatial stream in the uplink, we may profitably phase shift to the signal transmitted by a second antenna to maximize the power received at the BS. Assume $\hat{s}: \|\hat{s}\|^2=1$ and that we apply a phase shift of $e^{j\phi}$ to the second subscriber transmit path in order to maximize the total power received at the BS. This phase shifting corresponds to weighting the transit signal by vector of $$\hat{w} = \frac{1}{\sqrt{2}}\begin{bmatrix} 1 \\ e^{j\phi} \end{bmatrix}.$$

The power delivered to the BS antenna array is given by:

$$\begin{aligned} P &= \|\hat{H}\hat{w}\|^2 \\ &= \hat{w}^*\hat{H}^*\hat{H}\hat{w} \\ &= \hat{w}^*R\hat{w}. \end{aligned} \qquad (19)$$

Where $R=\hat{H}^*\hat{H}$ and $(\bullet)^*$ denotes conjugate transpose. It can be shown that an arbitrary phase rotation at the BS receive antenna does not affect the outcome as multiplication by a unitary matrix does not change the $l_2$ a vector. The Gram matrix R for the MIMO uplink channel is Hermetian and positive semi-definite; hence, it may be expressed as:

$$R = \begin{bmatrix} \alpha & \gamma e^{j\theta} \\ \gamma e^{-j\theta} & \beta \end{bmatrix}, \qquad (20)$$

where $\alpha$, $\beta$, and $\gamma$ are non-negative scalars and $\theta\in[0,2\pi)$. Using (19) and (20), we can express the uplink power delivered to the BS as:

$$\begin{aligned} P &= \hat{w}^*R\hat{w} \\ &= 0.5\begin{bmatrix} 1 & e^{-j\phi} \end{bmatrix}\begin{bmatrix} \alpha & \gamma e^{j\theta} \\ \gamma e^{-j\theta} & \beta \end{bmatrix}\begin{bmatrix} 1 \\ e^{j\phi} \end{bmatrix} \\ &= 0.5(\alpha + \gamma e^{j(\theta+\phi)} + \gamma e^{-j(\theta+\phi)} + \beta) \\ &= 0.5(\alpha + \beta + 2\gamma\cos(\theta+\phi)) \end{aligned} \qquad (21)$$

The angle which maximizes the received uplink power at BS is given by $\phi=-\theta$. Note that it is not necessary to compute the entire Gram matrix; rather, it suffices to compute the phase of one of the off diagonal entries of it. Hence, in the case of knowledge of the full MIMO channel, the desired phase may be computed according to (21). In the case of knowledge of the full MIMO channel, the desired phase shift $\phi(f)$ may be profitably computed on a frequency selective basis, wherein for each frequency, the phase is chosen based upon entries of the Gram matrix formed by the channel estimates. The desired phase shift may be compensated for phase differences between the transmit and/or receive paths. Said phase differences may be determined using calibration techniques employing directional couplers. In the case wherein multiport network is part of both the transmit and receive signal paths, as depicted in the following figure, FIG. 7, the multiport network may still be profitably employed. In this case, the multiport network appears as a change of coordinates in the received channel. The desired transmit phase may be calculated according to (21).

Figure 7:
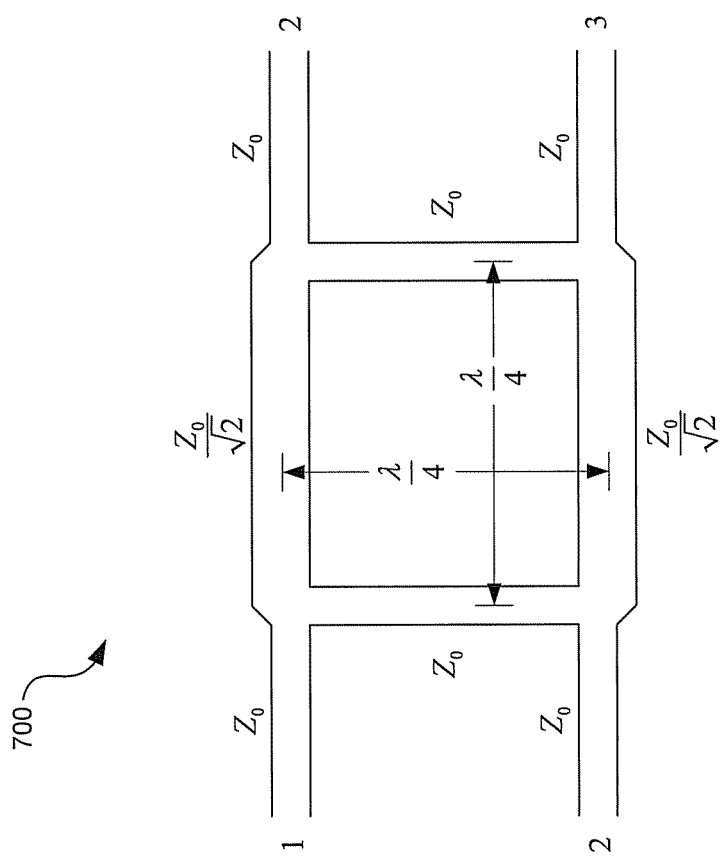
FIG. 7. shows an example of a multiport network, in connection with an embodiment of the invention.

FIG. 7. shows an example of a multiport network, in connection with an embodiment of the invention. Referring to FIG. 7, there is shown a multiport network 700 integrated into the subscriber station 200. The multiport network 700 comprise input ports 1 and 2, and output ports 3 and 4. The input ports 1 and 2 of the multiport network 700 may connect to the directional couplers 252 and 254 respectively, and the output ports 3 and 4 of the multiport network 700 may connect directly to the antenna 232 and 234. In this configuration, the multiport network 700 may be considered as part of the over the air communication channel. In this configuration, the subscriber station 200 may transmit and receive RF signals based on channel conditions present at the input ports, 1 and 2 of the multiport network 700. Deep fading, is a common occurrence in wireless channels, where one of the antenna 232 or 234 may receive a signal that is substantially lower in amplitude compared to the signal received by the second antenna. In such conditions, the transfer function of the multiport network 700, given in Equation (4) may transform the channel such that the signal present at the input ports 1 and 2 of the multiport network 700 into substantially similar amplitude.

The calibration procedure required to support the inclusion of the multiport network is identical to the calibration procedure described for the subscriber station terminal 200.

Figure 8:
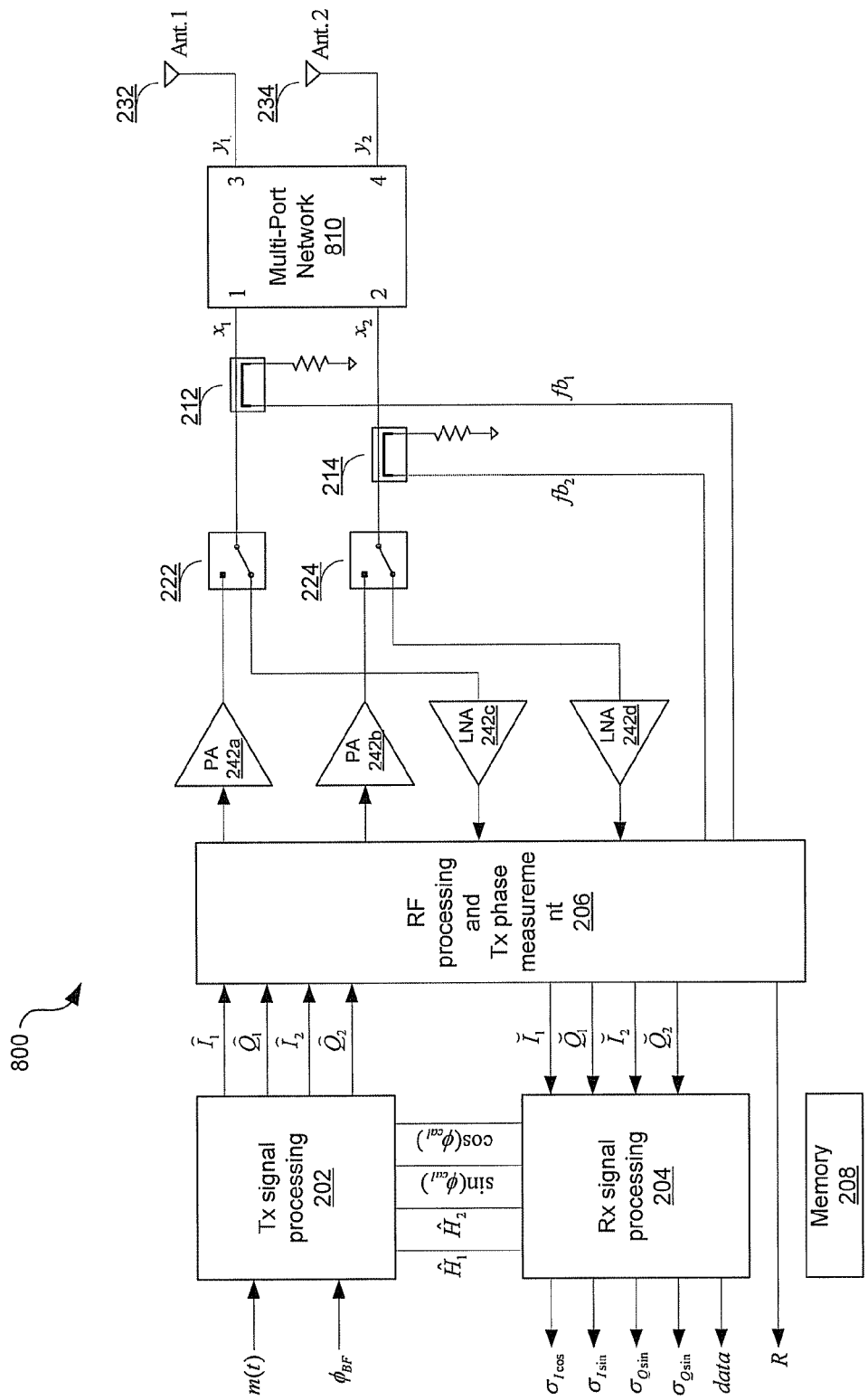
FIG. 8 shows an example of an implementation of a multiport network commonly referred to as a 90 degree hybrid coupler, in connection with an embodiment of the invention.

FIG. 8 shows an example of an implementation of a multiport network commonly referred to as a 90 degree hybrid coupler, in connection with an embodiment of the invention. Referring to FIG. 8, there is shown a 90 degree hybrid coupler 800 integrated into the subscriber station 200. For this exemplary embodiment, consider ports 1 and 2 as inputs and ports 3 and 4 as outputs. The 90 degree hybrid coupler 310 may be realized using transmission lines with electrical lengths and characteristic impedances as shown. Here, $Z_0$ denotes a characteristic impedance, typically 50 ohms;

$$\frac{\lambda}{4}$$

is a quarter wavelength line at the transmit center frequency.

The S-parameter matrix for a 2-port network is commonly used to describe the relationship between the reflected, incident power waves according to:

$$\begin{bmatrix} O_1 \\ O_2 \end{bmatrix} = \begin{bmatrix} S_{11} & S_{12} \\ S_{21} & S_{22} \end{bmatrix} \begin{bmatrix} I_1 \\ I_2 \end{bmatrix},$$

where $O_1$ and $O_2$ are the outputs and $I_1$ and $I_2$ are the inputs. Equivalently, $O_1 + S_{11}I_1 + S_{12}I_2$ and $O_2 = S_{21}I_1 + S_{22}I_2$. The transfer function of the multiport network 210 may be represented by a matrix of S-parameters.

The 90 degree hybrid coupler 800 has nominal scattering parameters given by $$[S] = \begin{bmatrix} 0 & j & 1 & 0 \\ j & 0 & 0 & 1 \\ 1 & 0 & 0 & j \\ 0 & 1 & j & 0 \end{bmatrix} \quad (22)$$

Let $$x = \begin{bmatrix} x_1 \\ x_2 \end{bmatrix}$$

be inputs to the hybrid, wherein $x_1$ denotes the signal applied to the input port 1 and $x_2$, the signal applied to the input port 2. Similarly, let $$y = \begin{bmatrix} y_1 \\ y_2 \end{bmatrix}$$

be outputs to the 90 degree hybrid coupler 800, wherein $y_1$ denotes the signal present at the output port 3 and $y_2$ the signal present at the output port 4. Using Equation (22), the nominal relationship between the vector of inputs x and the vector of outputs, y, is given by y=Ax where:

$$A = \begin{bmatrix} A_{11} & A_{12} \\ A_{21} & A_{22} \end{bmatrix} = \frac{-1}{\sqrt{2}} \begin{bmatrix} j & 1 \\ 1 & j \end{bmatrix} \quad (23)$$

In practice, 90 degree hybrid couplers exhibit loss and the relationship deviates somewhat from Equation (23). The 90 degree hybrid coupler 800 is a linear, time-invariant, passive, non-ferromagnetic circuit. Assume that the impedances seen by multiport by degree hybrid coupler 310 are nominal. Then, the following voltage relationship also holds:

$$x = A^T y \in \square^2, \quad (24)$$

where $\square$ denotes the field of complex numbers. Hence, under the above assumptions, the 90 degree hybrid coupler is a bidirectional device and the transfer function from one port to another does not depend on which is the input or output.

Figure 9:
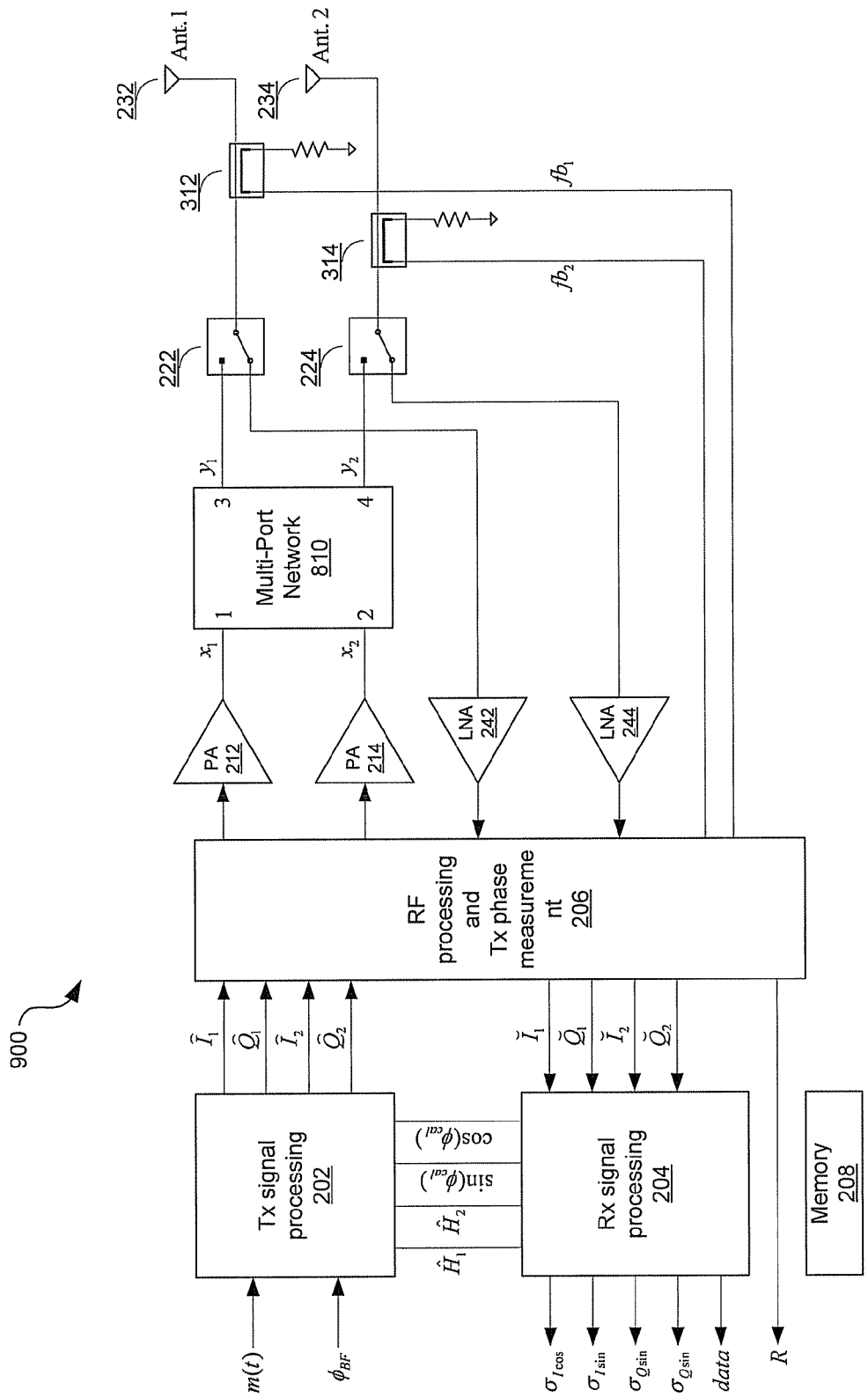
FIG. 9. shows another example of a multiport network, in connection with an embodiment of the invention.

FIG. 9. shows another example of a multiport network, in connection with an embodiment of the invention. Referring to FIG. 9, there is shown a multiport network 910 integrated into the subscriber station 200. FIG. 9. shows the inclusion of the multiport network 910 in an alternate position in the subscriber station 200. The input ports 1 and 2 of the multiport network 910 are connected to the power amplifiers 212 and 214 respectively. The output ports 3 and 4 of the multiport network 910 are connected to the transmit port of the transmit/receive switches 222 and 224 respectively. One main advantage is that the multiport network 910 now operates only on the transmit signal path, and the receive signal path of the subscriber station is un-altered. In this configuration, receiver interference observed on one of the antennas 232 and 234 does not couple to the second receive path. Hence, in interference limited channel conditions, the subscriber station can process interference from antenna 232 independently from 234. This ability allows the subscriber station to choose the best receive processing method that may include interference mitigation techniques independently for the two receive antenna. Hence, in this configuration, the receive performance of the subscriber station 200 is not dependent on the transfer function characteristics introduced by the multiport network.

The configuration of the multiport network shown in FIG. 9. introduces an additional complexity to the transmit phase calibration method proposed in FIG. 3 for Tx measurement unit, since the feedback coupled signal $fb_1$ and $fb_2$ are now proportional to a combination of the first and second transmit signals $X_1$ and $X_2$. The transmit output from the output ports 3 and 4 of the multiport network 910 may be modeled using the transfer function of the multiport network given by (4) multiplied by the transfer function of the two individual transmit paths. The feedback coupled signals can now be derived as $$\begin{bmatrix} I_{FB1}(t) \\ Q_{FB1}(t) \end{bmatrix} = g_{31} \begin{bmatrix} \cos(\theta_{tx31} + \theta_{fb}) & \sin(\theta_{tx31} + \theta_{fb}) \\ -\sin(\theta_{tx31} + \theta_{fb}) & \cos(\theta_{tx31} + \theta_{fb}) \end{bmatrix} \begin{bmatrix} \hat{I}_1(t) \\ \hat{Q}_1(t) \end{bmatrix} + \quad (25)$$

$$g_{32} \begin{bmatrix} \cos(\theta_{tx32} + \theta_{fb}) & \sin(\theta_{tx32} + \theta_{fb}) \\ -\sin(\theta_{tx32} + \theta_{fb}) & \cos(\theta_{tx32} + \theta_{fb}) \end{bmatrix} \begin{bmatrix} \hat{I}_2(t) \\ \hat{Q}_2(t) \end{bmatrix}$$

$$\begin{bmatrix} I_{FB2}(t) \\ Q_{FB2}(t) \end{bmatrix} = g_{41} \begin{bmatrix} \cos(\theta_{tx41} + \theta_{fb}) & \sin(\theta_{tx41} + \theta_{fb}) \\ -\sin(\theta_{tx41} + \theta_{fb}) & \cos(\theta_{tx41} + \theta_{fb}) \end{bmatrix} \begin{bmatrix} \hat{I}_1(t) \\ \hat{Q}_1(t) \end{bmatrix} + \quad (26)$$

$$g_{42} \begin{bmatrix} \cos(\theta_{tx42} + \theta_{fb}) & \sin(\theta_{tx42} + \theta_{fb}) \\ -\sin(\theta_{tx42} + \theta_{fb}) & \cos(\theta_{tx42} + \theta_{fb}) \end{bmatrix} \begin{bmatrix} \hat{I}_2(t) \\ \hat{Q}_2(t) \end{bmatrix}$$

Where the gain terms $g_{31}$, $g_{32}$, $g_{41}$, $g_{42}$, and the phase terms $\theta_{tx31}$, $\theta_{tx32}$, $\theta_{tx41}$, $\theta_{tx42}$ relate to the previously defined terms gain and phase $g_1$, $g_2$, $\theta_{tx1}$ and $\theta_{tx2}$ through the multiport transfer function (4), such that:

$$g_{31} \cdot e^{\theta_{tx31}} = S_{31} \cdot g_1 \cdot e^{\theta_{tx1}} \quad (27)$$

$$g_{32} \cdot e^{\theta_{tx32}} = S_{32} \cdot g_2 \cdot e^{\theta_{tx2}} \quad (28)$$

$$g_{41} \cdot e^{\theta_{tx41}} = S_{41} \cdot g_1 \cdot e^{\theta_{tx1}} \quad (29)$$

$$g_{42} \cdot e^{\theta_{tx42}} = S_{42} \cdot g_2 \cdot e^{\theta_{tx2}} \quad (30)$$

Where the parameters $S_{31}$, $S_{32}$, $S_{41}$ and $S_{42}$ represent the scatter parameters of the multiport network 910. An exemplary way to calculate the four different gain and phase terms given in equations (27) to (30) is as follows:

Step 1: Apply a valid transmit signal $X_1$, while setting $X_2=0$
Step 2: Configure switches 372, and 374 to monitor $fb_1$
Step 3: Follow procedure outlined in description of FIG. 3 to measure $g_{31}$, and $\theta_{tx31}$
Step 4: Configure switches 372, and 374 to monitor $fb_2$
Step 5: Follow procedure outlined in description of FIG. 3 to measure $g_{41}$, and $\theta_{tx41}$
Step 6: Apply a valid transmit signal $X_2$, while setting $X_1=0$
  Step 7: Repeat steps 2 through 5 to yield measurements $g_{32}$, $g_{42}$, $\theta_{tx32}$ and $\theta_{tx42}$ respectively.

Having factory calibrated the scattering parameters of the multiport network, the transmit phase differences may be calculated my modeling the effect said factory calibrated multiport network on the measured channel estimates $H1(f)$ and $H2(f)$. The advantage of the approach is that it affords transmit power gains in the presence of strong channel imbalances while maintaining the ability to exploit strong differences in interfering signal powers at the receive antennas.

Figure 10:
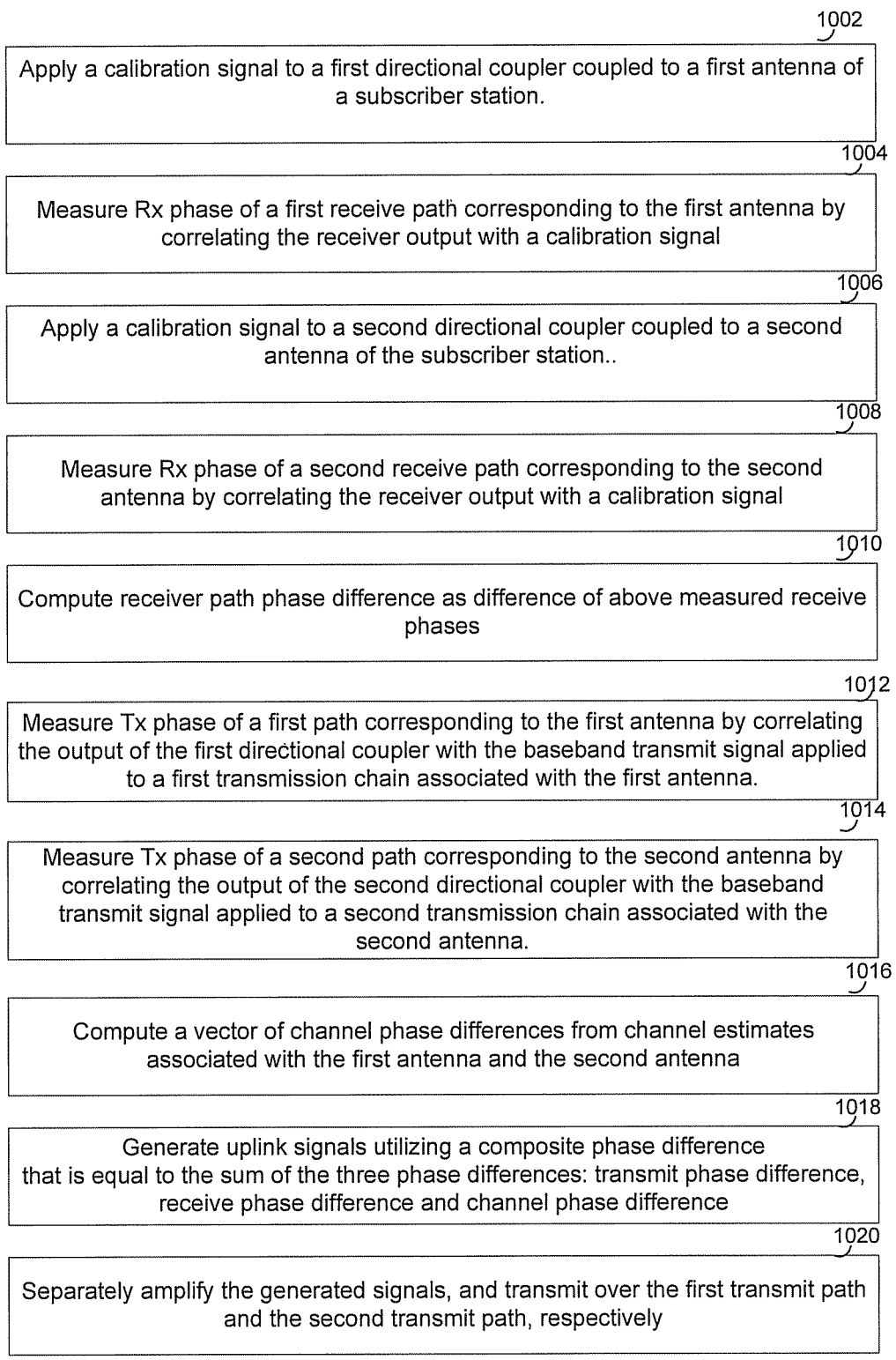
FIG. 10 is a flow chart illustrating an exemplary procedure that is utilized by a wireless transceiver to perform uplink beamforming calibration, in accordance with an embodiment of the invention.

FIG. 10 is a flow chart illustrating an exemplary procedure that is utilized by a wireless transceiver to perform uplink beamforming calibration, in accordance with an embodiment of the invention. Referring to FIG. 10, the exemplary steps may start with step 1002. In step 1002, the subscriber station transceiver 200 is coupled with a plurality of the antennas 232-234. Each antenna of the antenna arrays 232-234 may be coupled to associated corresponding transmission path and receive path via a single RF directional coupler. For example, the RF directional coupler 252 is coupled to the antenna 232 and the RF directional coupler 254 is coupled to the antenna 234, respectively. In this regard, the subscriber station transceiver 200 may be operable to apply a calibration signal, generated from the calibration generator 360, to a first directional coupler such as the RF directional coupler 252. In step 1004, the subscriber station transceiver 200 may be operable to measure Rx phase of a first receive path such as the receive path to the antenna 232, by correlating the receiver output with the calibration signal. In step 1006, the subscriber station transceiver 200 may apply the calibration signal to a second directional coupler such as the RF directional coupler 254. In step 1008, the subscriber station transceiver 200 may be operable to measure Rx phase of a second receive path such as the receive path associated with the antenna 234, for example, by correlating the receiver output with the calibration signal. In step 1010, the subscriber station transceiver 200 may be operable to compute receiver path difference between the measured Rx phase of the first receive path and the measured Rx phase of the second receive path. In step 1012, the subscriber station 200 may measure Tx phase of a first transmit path by correlating the output of the first directional coupler 252 with the baseband transmit signal applied to a first transmission chain associated with the antenna 232. In step 1014, the subscriber station 200 may be operable to measure transmit phase of a second transmit path by correlating the output of the second directional coupler 254 with the baseband transmit signal applied to a second transmission chain associated with the antenna 234. In step 1016, the subscriber 200 may be operable to compute a vector of receive phase differences from channel estimates associated with the antennas 232-234. In step 1018, the subscriber station 200 may be operable to generate uplink signals utilizing a composite phase difference that is equal to the sum of the three phase differences, as indicated in equation (4). In step 1020, the subscriber station 200 may separately amplify the generated signals, and transmit the generated signals over the first transmit path and the second transmit path, respectively.

In various exemplary aspects of the method and system uplink beamforming calibration in a multi-input-multi-output communication system, a wireless transceiver such as the subscriber station transceiver 200, comprising a transmitter and a receiver, is coupled to a plurality of antennas 232 and 234. The subscriber station transceiver 200 may receive RF signals via said plurality of antennas from one or more antennas of the base station 110. The subscriber station transceiver 200 may be operable to determine transmit phase relationship such as transmit phase difference between said plurality of antennas based on the received RF signals. For example, the receiver RF signals may be processed to determine receiver performance such as receive signal strength and receive data rate at the subscriber station transceiver 200. The subscriber station transceiver 200 may be operable to determine transmit phase relationship between a plurality of antennas based on the determined receiver performance. One or more transmit antennas such as the antennas 232 and 234 and corresponding transmit power levels may be selected based on the determined transmit phase relationship and the determined receiver performance.

The subscriber station transceiver 200 may transmit RF signals to the base station 110 utilizing the selected transmit antennas 232 and 234 at the selected transmit power levels. The received RF signals from the base station 110 may comprise subcarriers that may overlap with one or more groups of subcarriers to be allocated to a plurality of antennas 232 and 234. In other words, the received RF signals may be transmitted, from the base station 110, in subcarriers that may comprise at least a portion of subcarriers allocated by the base station 110 to the subscriber station 120 for transmission.

The performance for the reception of the RF signals from the base station may be performed on a frequency selective basis or on a non-frequency basis. The determined receiver performance may comprise receive signal strength, signal-to-noise ratio, signal strength, date rate, the variance of the received signal, and various receive error rates such as BER and FER for the received RF signals. In this regard, the subscriber station transceiver 200 may calibrate each receive path to a plurality of antennas 232 and 234 based on the determined receive performance. For example, receiving power levels may be adjusted, at the LNAs 319a and 319b, based on the receive signal strength indicated in the determined receive performance.

During transmission, the subscriber station transceiver 200 may perform RF measurement on the transmitting RF signals. In this regard, the transmit power and the transmit phase of the transmitting RF signals may be determined or calculated utilizing samples extracted from the transmitting RF signals through the directional couplers 252 and 254, for example. The subscriber station transceiver 200 may be operable to dynamically adjust transmit phase relationship between a plurality of antennas based on the transmit power measurements and the transmit phase measurements over the selected transmit antennas 232 and 234, and the determined receive signal characteristics associated with antennas 232 and 234.

The subscriber station transceiver 200 may characterize or determine transmit channel qualities for a plurality of antennas based on the transmit power measurements and the transmit phase measurements over the selected transmit antennas 232 and 234, the selected transmit phase relationship and the determined receiver performance. The subscriber station transceiver 200 may dynamically a plurality of transmit antennas based on the adjusted transmit phase relationship, the characterized transmit channel qualities and the determined receiver performance. In this regard, the dynamically selected transmit power levels indicate that the majority of transmission power at the subscriber station transceiver 200 may be directed to the selected transmit antennas. The subscriber station transceiver 200 may transmit subsequent RF signals to the base station 110 utilizing the dynamically selected transmit antennas at the selected transmit power levels.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for uplink beamforming calibration in a multi-input-multi-output communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a wireless communication device comprising a receiver, transmitter and a plurality of antennas:
determining transmit phase relationship between at least two of said plurality of antennas based on radio frequency signals received by said plurality of antennas, wherein said radio frequency signals are received from one or more antennas of a base station;
transmitting radio frequency signals to said base station from, said at least two of said plurality of antennas using said determined transmit phase relationship; and
receiving said radio frequency signals, from said one or more antennas of said base station, wherein subcarriers to be allocated for said transmission are a subset of subcarriers of said received radio frequency signals.

2. A method for communication, the method comprising:
in a wireless communication device comprising a receiver, a transmitter and a plurality of antennas:
determining transmit phase relationship between at least two of said plurality of antennas based on radio frequency signals received by said plurality of antennas, wherein said, radio frequency signals are received from one or more antennas of a base station;
transmitting radio frequency signals to said base station from said at least two of said plurality of antennas using said determined transmit phase relationship; and
determining performance of said receiver on a frequency selective basis or on a non-frequency basis.

3. The method according to claim 2, farther comprising calibrating one or more receive paths of said receiver based on said determined performance of said receiver for subsequently receiving radio frequency signals via said at least two of said plurality of antennas from said one or more antennas of said base station.

4. The method according to claim 2, further comprising measuring transmit power and transmit phase of said transmitted radio frequency signals during said transmission for said determined performance of said receiver.

5. The method according to claim 4, further comprising dynamically adjusting said determined transmit phase relationship between said at least two of said plurality of antennas based on said transmit power measurements and said transmit phase measurements over said selected transmit antennas, and said determined performance of said receiver.

6. The method according to claim 5, further comprising determining transmit channel qualities for said at least two of said plurality of antennas based on said transmit power measurements and said transmit phase measurements over said selected transmit antennas, said dynamically adjusted transmit phase relationship and said determined performance of said receiver.

7. The method according to claim 6, further comprising dynamically selecting two or more of said plurality of antennas and corresponding transmit power levels based on said dynamically adjusted transmit phase relationship, said determined transmit channel qualities and said determined performance of said receiver.

8. The method according to claim 7, wherein said dynamically selected corresponding transmit power levels correspond to a majority of transmission power at said transmitter.

9. The method according to claim 7, further comprising transmitting subsequent radio frequency signals to said one or more antennas of said base station utilizing said dynamically selected two or more of said plurality of antennas at said dynamically selected corresponding transmit power levels.

10. The method according to claim 2, further comprising dynamically adjusting said determined transmit phase relationship between said at least two of said plurality of antennas based on received signal characteristics, the received signal characteristics including at least one of received signal strength, signal-to-noise ratio, estimated interference power, and variance of received signal.

11. A system for communication, the system comprising:
one or more processors and/or circuits for use in a wireless communication device comprising a plurality of antennas, said one or more processors and/or circuits comprising a receiver and a transmitter, and said one or more processors and/or circuits being configured to:
determine transmit phase relationship between at least two of said plurality of antennas based on radio frequency signals received by said plurality of antennas, wherein said radio frequency signals are received from one or more antennas of a base station;
transmit radio frequency signals to said base station from said at least two of said plurality of antennas using said determined transmit phase relationship; and
receive said radio frequency signals, from said one or more antennas of said base station, wherein subcarriers to be allocated for said transmission are a subset of subcarriers of said received radio frequency signals.

12. A system for communication, the system comprising:
one or more processors and/or circuits for use in a wireless communication device comprising a plurality of antennas, said one or more processors and/or circuits comprising a receiver and a transmitter, and said one or more processors and/or circuits being configured to:
determine transmit phase relationship between at least two of said plurality of antennas based on radio frequency signals received by said plurality of antennas, wherein said radio frequency signals are received from one or more antennas of a base station;
transmit radio frequency signals to said base station from sad at least two of said plurality of antennas using said determined transmit phase relationship; and
determine performance of said receiver on a frequency selective basis or on a non-frequency basis.

13. The system according to claim 12, wherein said one or more processors and/or circuits are further configured to calibrate one or more receive paths of said receiver based on said determined performance of said receiver for subsequently receiving radio frequency signals via said at least two of said plurality of antennas from said one or more antennas of said base station.

14. The system according to claim 12, wherein said one or more processors and/or circuits are further configured to measure transmit power and transmit phase of said transmit radio frequency signals during said transmission for said determined performance of said receiver.

15. The system according to claim 14, wherein said one or more processors and/or circuits are further configured to dynamically adjust said determined transmit phase relationship between said at least two of said plurality of antennas based on said transmit power measurements and said transmit phase measurements over said selected transmit antennas, and said determined performance of said receiver.

16. The system according to claim 15, wherein said one or more processors and/or circuits are further configured to determine transmit channel qualities for said at least two of said plurality of antennas based on said transmit power measurements and said transmit phase measurements over said selected transmit antennas, said dynamically adjusted transmit phase relationship and said determined performance of said receiver.

17. The system according to claim 16, wherein said one or more processors and/or circuits are further configured to dynamically select two or more of said plurality of antennas and corresponding transmit power levels based on said dynamically adjusted transmit phase relationship, said determined transmit channel qualities and said determined performance of said receiver.

18. The system according to claim 17, wherein said dynamically selected corresponding transmit power levels correspond to majority of transmission power at said wireless transmitter.

19. The system according to claim 18, wherein said one or more processors and/or circuits are further configured to transmit subsequent radio frequency signals to said one or more antennas of said base station utilizing said dynamically selected two or more of said plurality of antennas at said dynamically selected corresponding transmit power levels.

20. The system according to claim 12, wherein said one or more processors and/or circuits are further configured to dynamically adjust said determined transmit phase relationship between said at least two of said plurality of antennas based on received signal characteristics, the received signal characteristics including at least one of received signal strength, signal-to-noise ratio, estimated interference power, and variance of received signal.

* * * * *

UNITED STATES PATENT AND TRADEMARK OFFICE
CERTIFICATE OF CORRECTION

PATENT NO. : 8,428,529 B2  
APPLICATION NO. : 13/023539  
DATED : April 23, 2013  
INVENTOR(S) : Dakshinamurthy et al.

Page 1 of 1

It is certified that error appears in the above-identified patent and that said Letters Patent is hereby corrected as shown below:

In the Claims:

Column 22, Line 40, replace "a receiver," with --a receiver, a--.

Column 22, Line 48, replace "from," with --from--.

Column 22, Line 61, replace "said," with --said--.

Column 23, Line 1, replace "farther" with --further--.

Column 24, Line 9, replace "sad" with --said--.

Signed and Sealed this  
Fourth Day of June, 2013

Teresa Stanek Rea  
*Acting Director of the United States Patent and Trademark Office*